(12) United States Patent
Nandu

(10) Patent No.: US 11,084,273 B2
(45) Date of Patent: Aug. 10, 2021

(54) GENERATING TOOL PATHS TO PRESERVE FILAMENT CONTINUITY IN ADDITIVE MANUFACTURING

(71) Applicant: Arevo, Inc., Santa Clara, CA (US)

(72) Inventor: Sohil Nandu, Sunnyvale, CA (US)

(73) Assignee: Arevo, Inc., Milpitas, CA (US)

( * ) Notice: Subject to any disclaimer, the term of this patent is extended or adjusted under 35 U.S.C. 154(b) by 279 days.

(21) Appl. No.: 16/037,706

(22) Filed: Jul. 17, 2018

(65) Prior Publication Data
US 2020/0023573 A1   Jan. 23, 2020

(51) Int. Cl.
*B32B 3/10* (2006.01)
*B33Y 30/00* (2015.01)
*B29L 31/30* (2006.01)
*B32B 7/04* (2019.01)

(52) U.S. Cl.
CPC ....... *B33Y 30/00* (2014.12); *B29L 2031/3091* (2013.01); *B32B 7/04* (2013.01); *B32B 2605/00* (2013.01); *Y10T 428/24802* (2015.01)

(58) Field of Classification Search
None
See application file for complete search history.

(56) References Cited

U.S. PATENT DOCUMENTS

| | | | |
|---|---|---|---|
| 9,688,028 B2 | 6/2017 | Mark et al. | |
| 9,956,725 B2 | 5/2018 | Mark et al. | |
| 9,977,631 B2 | 5/2018 | Cudak et al. | |
| 10,016,942 B2 | 7/2018 | Mark et al. | |
| 2017/0232674 A1* | 8/2017 | Mark | B33Y 30/00 264/308 |

\* cited by examiner

*Primary Examiner* — Christopher M Polley
(74) *Attorney, Agent, or Firm* — Peter H. Priest; Kenneth Ottesen

(57) ABSTRACT

An article of manufacture is disclosed that comprises an infill made from linear segments of filament, such as but not limited to continuous carbon fiber-reinforced thermoplastic filament. Approaches to tool path generation are addressed in which material runs of filament are applied that distribute where cuts, beginning, or ends of segments occur or points where two ends of segments are fused or the like to preserve filament continuity by reducing the number of short segments. Aspects of one approach include identifying long edges and eliminating short edges which acute angles with long edges and utilizing a clipping outline as part of the process of determining start and end points of material runs.

5 Claims, 23 Drawing Sheets

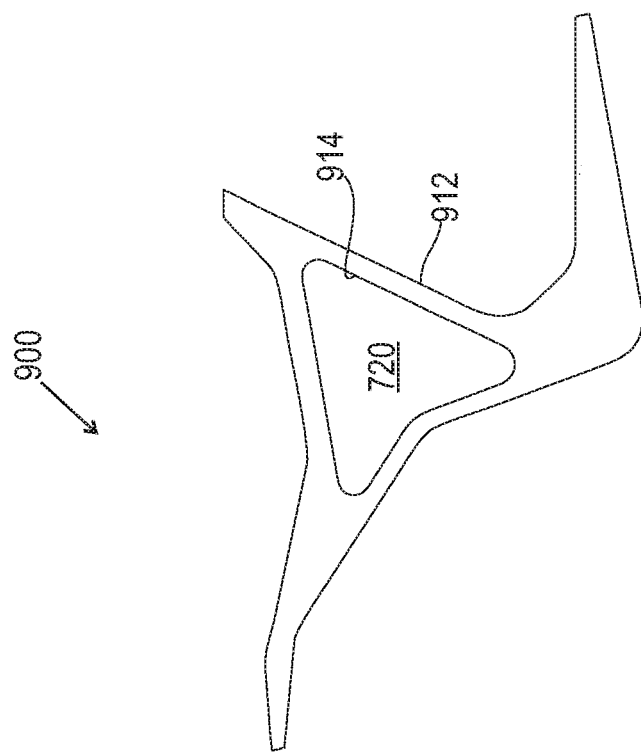
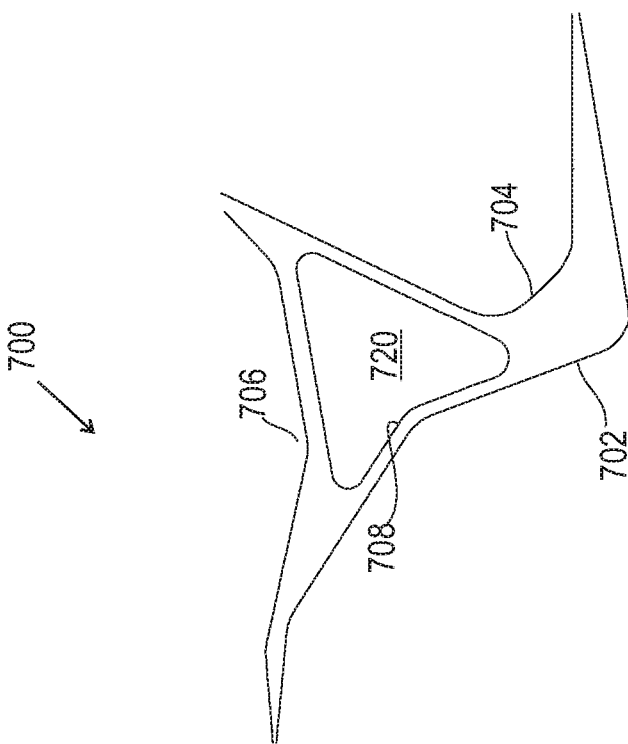
FIG. 9A
FIG. 9B

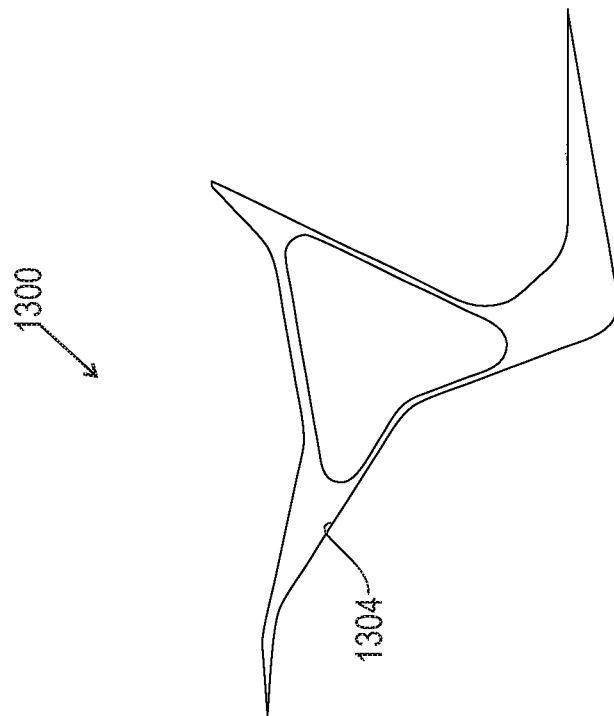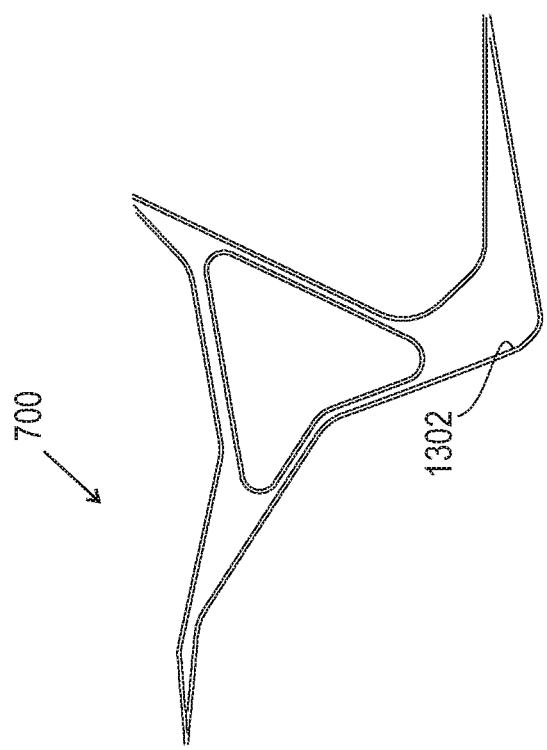

GENERATING TOOL PATHS TO PRESERVE FILAMENT CONTINUITY IN ADDITIVE MANUFACTURING

STATEMENT OF RELATED APPLICATIONS

This application is related to co-pending U.S. patent application Ser. No. 16/037,768 filed on Jul. 17, 2018, entitled "Fiber Feathering in Additive Manufacturing", which is assigned to the assignee of the present application and incorporated by reference herein in its entirety.

TECHNICAL FIELD

The present invention relates generally to aspects of additive manufacturing of three-dimensional articles, and, more particularly, to improved techniques for fabricating articles of manufacture employing advantageous techniques for generating tool paths to preserve filament continuity as addressed further herein.

BACKGROUND

In general, there are two complementary approaches to fabricate an article of manufacture: additive manufacturing and subtractive manufacturing.

Additive manufacturing involves aggregating material to form the desired article of manufacture. In contrast, subtractive manufacturing involves removing material to form the desired article of manufacture. In practice, many articles of manufacture are fabricated using a combination of additive and subtractive techniques.

A form of additive manufacturing—colloquially known as "3D printing"—is the subject of intense research and development because it enables the fabrication of articles of manufacture with complex geometries. Furthermore, 3D printing enables the mass customization of articles of manufacture with different dimensions and characteristics. See, for example, U.S. patent application Ser. No. 15/899,361, filed Feb. 19, 2018, entitled "Hexagonal Sparse Infill Made of Linear Segments of Filament," and U.S. patent application Ser. No. 15/899,360, filed Feb. 19, 2018, entitled "Quadrilateral Sparse Infill Made of Linear Segments of Filament", both of which are assigned to the assignee of the present application and incorporated by reference in their entirety. There remain, however, many challenges in the design, manufacture, and use of 3D printers, as well as, in the advancement of 3D printing processes.

Consider the task of designing an article to be sufficiently strong to resist a wide array of forces encountered in real world usage, but lightweight. An article of a given material, a given external geometry, and a solid interior is typically stronger than an article with a hollow interior. In contrast, an article of a given material, a given external geometry, and a hollow interior is typically lighter than an article with a solid interior.

There are, however, more options for the interior and one such option is a sparse infill. A sparse infill (herein also called an "infill") is a porous or skeletal or cellular structure that is stronger than a hollow interior and lighter in weight than a solid interior.

Infills are commonly incorporated into articles that are 3D printed, and it is well-known how to make an infill using a 3D printing technology in which the structural integrity of the infill is independent of the macroscopic properties of the materials used to make the structure. For example, the structural integrity of an infill made of acrylonitrile butadiene styrene (ABS) is independent of how the plastic is cut up and assembled. It is well-known in the prior art how to make an infill using ABS with fused-deposition modeling ("FDM").

SUMMARY OF THE INVENTION

In contrast, the structural integrity of the infill is dependent on the macroscopic properties of some materials. For example, the structural integrity of an infill made of fiber-reinforced thermoplastic filament is dependent on how the filament is cut up and assembled. In general, one structural advantage of a fiber-reinforced filament is diminished when the filament is cut, and, therefore, cuts are to be avoided when possible and should be strategically placed as addressed further herein. Put otherwise, longer uninterrupted fiber reinforced filament runs are generally stronger than shorter runs. Thus, for an article of manufacture having an edge or edges requiring extra strength, a long uninterrupted fiber reinforced filament run is desirable along such edges.

As noted above, for some materials, such as ABS plastic, discontinuities can be addressed by fusing the first and second segments together. But, for other materials, the mere act of cutting the filament significantly weakens the material by cutting internal reinforcing fibers, and fusing the various segments does not fix the problem as an aligned series of fused joints is susceptible to failure upon application of a shearing force.

Beyond the difficulties addressed advantageously by the related applications addressed above and elsewhere herein, a different class or type of problem is encountered by article geometries which require a filament to be cut or otherwise applied in a discontinuous manner as shown in FIG. 1A. In FIG. 1A, three filaments 10, 20, and 30 are shown each having an internal reinforcing fiber or fibers represented by dashed lines. While represented by dashes, these fibers are typically long continuous fibers. In FIG. 1A, the filaments 10, 20, and 30 have been cut or otherwise deposited in a discontinuous manner and then fused in regions 14, 24, and 34, respectively. As these fused regions 14, 24, and 34 do not include continuous internal reinforcing fibers they are weaker than the remainder of the filaments 10, 20 and 30. As a result, a much smaller force $F_1$ is required to damage the aligned fused regions 14, 24, and 34 than the force $F_2$ required to cause damage to the filaments 10, 20 and 30 where $F_2$ is applied along a length of filament 30 where continuous reinforcing fibers 32 help spread and dissipate that force.

In FIG. 1B, regions 14', 24' and 34' in filaments 10', 20' and 30', respectively, have been moved so that they no longer align. The separation of the regions 14', 24' and 34' in the x-dimension is preferably at least a predetermined distance, d, where that spacing is possible.

While FIGS. 1A and 1B illustrate an advantageous solution to a problem in the x-y plane, the present invention also provides an advantageous technique for generating a tool path to distribute starting and ending filament points across slices in the z-plane as well, as addressed further herein in connection with FIG. 21, for example.

Among its several aspects, the present invention recognizes as a general matter, when a number of filament strands end in a straight line or end near each other (see region 320 of FIG. 3, for an example), there is a seam which will be a weaker spot in the part. While a few simple shapes might have very long uninterrupted filament runs with few cuts, due to process or mechanical constraints, there will usually be some spots in a typical part where multiple filaments will have to end near each other. Instead of having them line up in a perfect seam, having them staggered as shown in FIG. 1B will provide an advantageous benefit. While a long continuous filament without a seam or cuts is preferable, this preferred end is difficult to achieve given the process and mechanical constraints of real-world articles of manufacture. Such articles often have both long edges and short edges and one or more acute angles between such edges, as illustrated by an exemplary bicycle frame addressed herein. These short edges and acute angles, as well as, other design constraints such as the sharpening of angles as tool paths and material runs move from the edges to the interior of a part can result in too many short material runs as addressed further herein.

As used herein, filament feathering is when the ends of tool paths defining runs of material, such as fiber reinforced filament, meet in a staggered pattern as addressed in further detail herein. One presently preferred fiber feathering approach addressed herein is an outcome of an edge-offsetting strategy flowing from a tool path generation technique to preserve filament continuity used to generate tool paths for material runs. As addressed in greater detail herein, the tool path generation technique may advantageously employ a process in which long and short edges, acute angled joins of edges and a clipping outline are advantageously employed to preserve filament continuity by decreasing the number of short material runs and material runs making abrupt turns leading to filament stops and restarts.

Embodiments of the present invention enable an article to be fabricated with fiber reinforced filament without some of the costs and disadvantages for doing so in the prior art. For example, some embodiments of the present invention deposit segments of filament in shapes and locations in which discontinuities would otherwise occur so that the number of aligned discontinuities, filament cuts, or other weak seams and the like are reduced. Furthermore, some embodiments of the present invention deposit segments of filament in shapes and locations so that the harmful effects of aligned discontinuance are at least partially eliminated. In general, this advantageous result is achieved by depositing the segments of filament employing filament feathering to carefully distribute the locations of filament beginnings and endings, cuts, or discontinuities, and the like.

Embodiments of the present invention are described in detail that enable the fabrication of a wide variety of articles of manufacture having a better balance of strength resulting from long relatively straight uninterrupted lengths of filament where required without an excess of aligned filament cuts or discontinuities as addressed further herein.

A more complete understanding of the present invention, as well as further features and advantages of the invention, will be apparent from the following Detailed Description and the accompanying drawings.

BRIEF DESCRIPTION OF THE DRAWINGS

FIGS. 9A and 9B show the starting edges of a bicycle frame and a starting clipping outline of the bicycle frame, respectively.

FIGS. 10A and 1013 show offset edge one and clipping outline one side by side.

FIGS. 13A and 13B show offset edge four and clipping outline four side by side.

DETAILED DESCRIPTION

Figure 1A:
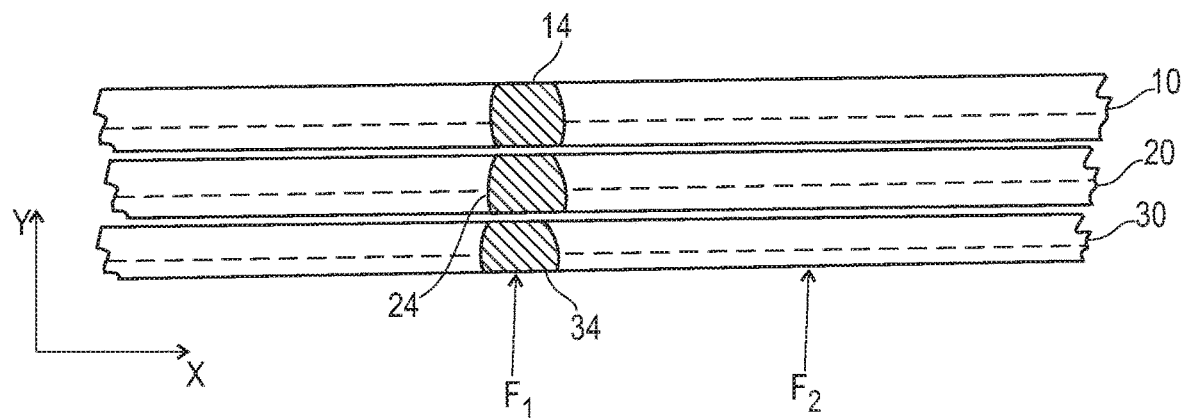
FIGS. 1A and 1B provide a simplified illustration of the type of problem presented by filament discontinuity and an application of filament feathering in accordance with the present invention to advantageously address this problem.
Figure 1B:
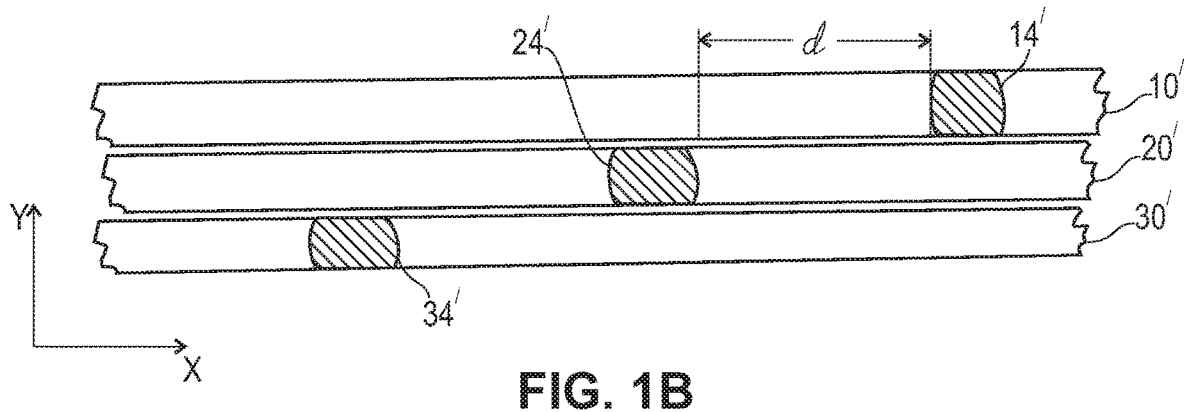
Figure 2:
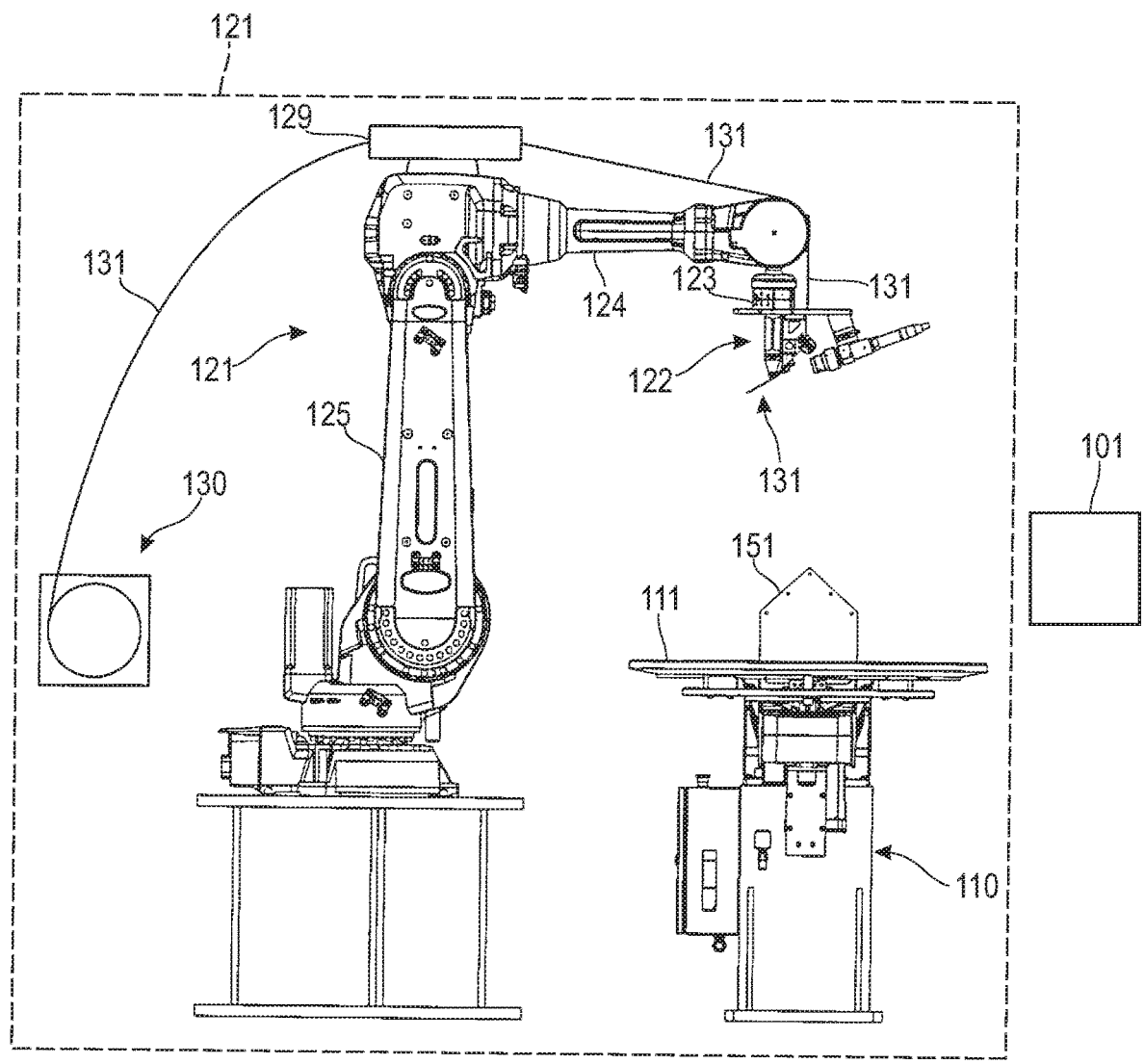
FIG. 2 depicts an illustration of the components of an additive manufacturing system 100 suitably adapted to provide fiber feathering and to generate tool paths to preserve filament continuity in accordance with an illustrative embodiment of the present invention.

FIG. 2 depicts an illustration of the components of an exemplary additive manufacturing system 100 in accordance with the illustrative embodiments of the present invention. Additive manufacturing system 100 comprises: controller 101, build chamber 102, turntable 110, deposition build plate 111, robot 121, deposition head 122, filament conditioning unit 129, filament source 130, and thermoplastic filament 131. The purpose of manufacturing system 100 is to fabricate articles of manufacture, such as illustrative article 151 of FIG. 1, as well as the article of FIG. 7, for example. It will be recognized that the teachings of the present invention are applicable to a wide range of articles of manufacture and the particular illustrations herein are exemplary.

Controller 101 comprises the hardware and software necessary to direct build chamber 102, robot 121, deposition head 122, and turntable 110, in order to fabricate the article 151 or other desired articles. In light of the present teachings, it will be clear to those skilled in the art how to make and use controller 101 to perform filament feathering and tool path generation to preserve filament continuity in additive manufacturing as addressed further in connection with FIGS. 3-21 below.

Build chamber 102 is a thermally-insulated, temperature-controlled environment in which article 151 is fabricated.

Turntable 110 comprises a stepper motor—under the control of controller 101—that is capable of rotating build plate 111 (and, consequently article 151) around the Z-axis (i.e., orthogonal to the build plate). In particular, turntable 110 is capable of:
  i. rotating build plate 111 clockwise around the Z-axis from any angle to any angle, and
  ii. rotating build plate 111 counter-clockwise around the Z-axis from any angle to any angle, and
  iii. rotating build plate 111 at varying rates, and as desired for a particular application, and
  iv. maintaining (statically) the position of build plate 111 at any angle.

Build plate 111 is a platform comprising hardware on which article 151 is fabricated. Build plate 111 is configured to receive heated filament deposited by deposition head 122.

Robot 121 is capable of depositing a segment of fiber-reinforced thermoplastic filament from any three-dimensional coordinate in build chamber 102 to any other three-dimensional coordinate in build chamber 102 with deposition head 122 at any approach angle. To this end, robot 121 comprises a multi-axis (e.g., six-axis, seven-axis, etc.), mechanical arm that is under the control of controller 101. Software for controller 101 generates tool paths to preserve filament continuity as addressed further herein. The mechanical arm comprises first arm segment 123, second arm segment 124, and third arm segment 125. The joints between adjoining arm segments are under the control of controller 101. A non-limiting example of robot 121 is the IRB 4600 robot offered by ABB.

The mechanical arm of robot 121 can move deposition head 122 in:
  i. the +X direction,
  ii. the −X direction,
  iii. the +Y direction,
  iv. the −Y direction,
  v. the +Z direction,
  vi. the −Z direction, and
  vii. any combination of i, ii, iii, iv, v, and vi,
while rotating the approach angle of deposition head 122 around any point or temporal series of points. While the present application is explained utilizing an x, y, z coordinate system, it will be appreciated the present teachings can be translated to other coordinate systems if desired. Further, while the robot 121 can be controlled as addressed above, it can also be more simply implemented and controlled more simply in an x-y plane and then stepped up a step in the z plane, an operation sometimes referred to as 2.5D.

Deposition head 122 comprises hardware that is under the control of controller 101 and that deposits fiber-reinforced thermoplastic filament 131. Deposition head 122 is described in detail in pending United States Patent Applications:
  (i) Ser. No. 15/827,721, entitled "Filament Guide," filed on Nov. 30, 2017;
  (ii) Ser. No. 15/827,711, entitled "Filament Heating in 3D Printing Systems," filed on Nov. 30, 2017;
  (iii) Ser. No. 15/854,673, entitled "Alleviating Torsional Forces on Fiber-Reinforced Thermoplastic Filament," filed on Dec. 26, 2017;
  (iv) Ser. No. 15/854,676, entitled "Depositing Arced Portions of Fiber-Reinforced Thermoplastic Filament," filed Dec. 26, 2017;
all of which are incorporated by reference in their entirety and particularly for the purpose of describing additive manufacturing system 100 in general, and deposition head 122 in particular. The following patent applications are incorporated by reference for their description of how to make and use additive manufacturing system 100:
  U.S. patent application Ser. No. 15/438,559, filing date Feb. 21, 2017;
  U.S. patent application Ser. No. 15/375,832, filing date Dec. 12, 2016;
  U.S. patent application Ser. No. 15/232,767, filing date Aug. 9, 2016;
  U.S. patent application Ser. No. 14/574,237, filing date Dec. 17, 2014;
  and
  U.S. patent application Ser. No. 14/623,471, filing date Feb. 16, 2015.

Filament conditioning unit 129 comprises hardware that pre-heats filament 131 prior to deposition.

Filament 131 comprises a tow of reinforcing fibers that is substantially parallel to its longitudinal axis. In accordance with the illustrative embodiments, filament 131 comprises a cylindrical towpreg of contiguous 12K carbon fiber that is impregnated with thermoplastic resin. Thermoplastic filament 131 comprises contiguous carbon fiber, but it will be clear to those skilled in the art, after reading this disclosure, how to make and use alternative embodiments of the present invention in which thermoplastic filament 131 has a different fiber composition.

It will be clear to those skilled in the art, after reading this disclosure, how to make and use alternative embodiments of the present invention in which filament 131 comprises a different number of fibers (e.g., 1K, 3K, 6K, 24K, etc.). It will be clear to those skilled in the art, after reading this disclosure, how to make and use alternative embodiments of the present invention in which the fibers in filament 131 are made of a different material (e.g., fiberglass, aramid, carbon nanotubes, etc.).

In accordance with the illustrative embodiments, the thermoplastic is, in general, a semi-crystalline polymer and, in particular, the polyaryletherketone (PAEK) known as polyetherketone (PEK). In accordance with some alternative embodiments of the present invention, the semi-crystalline material is the polyaryletherketone (PAEK), polyetheretherketone (PEEK), polyetherketoneketone (PEKK), polyetheretherketoneketone (PEEKK), or polyetherketoneetherketoneketone (PEKEKK). As those who are skilled in the art will appreciate after reading this specification, the disclosed annealing process, as it pertains to a semi-crystalline polymer in general, takes place at a temperature that is above the glass transition temperature, $T_g$.

In accordance with some alternative embodiments of the present invention, the semi-crystalline polymer is not a polyaryletherketone (PAEK) but another semi-crystalline thermoplastic (e.g., polyamide (PA), polybutylene terephthalate (PBT), poly(p-phenylene sulfide) (PPS), etc.) or a mixture of a semi-crystalline polymer and an amorphous polymer.

When the filament comprises a blend of an amorphous polymer with a semi-crystalline polymer, the semi-crystalline polymer can be one of the aforementioned materials and the amorphous polymer can be a polyarylsulfone, such as polysulfone (PSU), polyethersulfone (PESU), polyphenylsulfone (PPSU), polyethersulfone (PES), or polyetherimide (PEI). In some additional embodiments, the amorphous polymer can be, for example and without limitation, polyphenylene oxides (PPOs), acrylonitrile butadiene styrene (ABS), methyl methacrylate acrylonitrile butadiene styrene copolymer (ABSi), polystyrene (PS), or polycarbonate (PC). As those who are skilled in the art will appreciate after reading this specification, the disclosed annealing process, as it pertains to a blend of an amorphous polymer with a semi-crystalline polymer, takes place generally at a lower temperature than a semi-crystalline polymer with the same glass transition temperature; in some cases, the annealing process can take place at a temperature slightly below the glass transition temperature.

When the filament comprises a blend of an amorphous polymer with a semi-crystalline polymer, the weight ratio of semi-crystalline material to amorphous material can be in the range of about 50:50 to about 95:05, inclusive, or about 50:50 to about 90:10, inclusive. Preferably, the weight ratio of semi-crystalline material to amorphous material in the blend is between 60:40 and 80:20, inclusive. The ratio selected for any particular application may vary primarily as a function of the materials used and the properties desired for the printed article.

In some alternative embodiments of the present invention, the filament comprises a metal. For example, and without limitation, the filament can be a wire comprising stainless steel, Inconel® (nickel/chrome), titanium, aluminum, cobalt chrome, copper, bronze, iron, precious metals (e.g., platinum, gold, silver, etc.).

Figure 7:
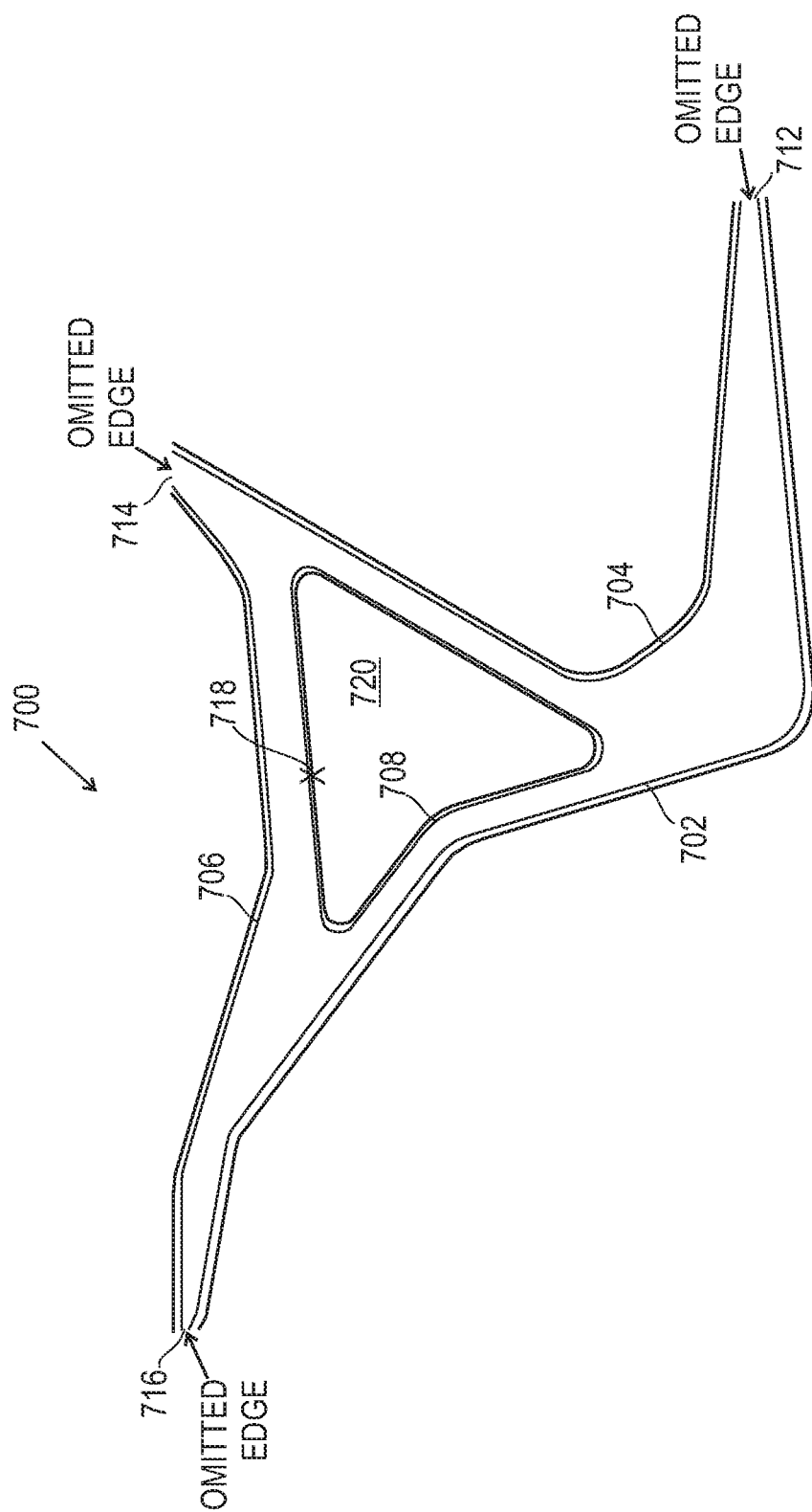
FIG. 7 shows a top view of the entirety of the bicycle frame of FIG. 4 with four long edges to illustrate an edge-offsetting strategy providing filament continuity in accordance with the present invention.

To design an article of manufacture, such as article 151 or a bicycle frame like the one shown in FIG. 7, a human designer uses a computer-aided-design system (e.g., Dassault Systèmes Solid Works®, etc.) to specify the desired spatial, structural, and other physical properties of the article of manufacture. The salient spatial features of a single slice of an article in the x-y plane are depicted in FIGS. 4-18B. The human designer and computer-aided-design system select an infill archetype for article 151, and generate a fully-custom infill—based on the selected infill archetype—for article 151 that satisfies the structural and other physical properties with the adaptations and modifications addressed further below.

In accordance with the first illustrative embodiment, each segment in each layer has—after deposition—a thickness of 500 μm or 0.5 mm, and, therefore, each layer has a thickness of 0.5 mm. It will be clear to those skilled in the art, however, after reading this disclosure, how to make and use alternative embodiments of the present invention in which each segment in each layer has—after deposition—another thickness. Furthermore, it will be clear to those skilled in the art, after reading this disclosure, how to make and use alternative embodiments of the present invention in which one or more layers has a different thickness than one or more other layers.

Figure 3:
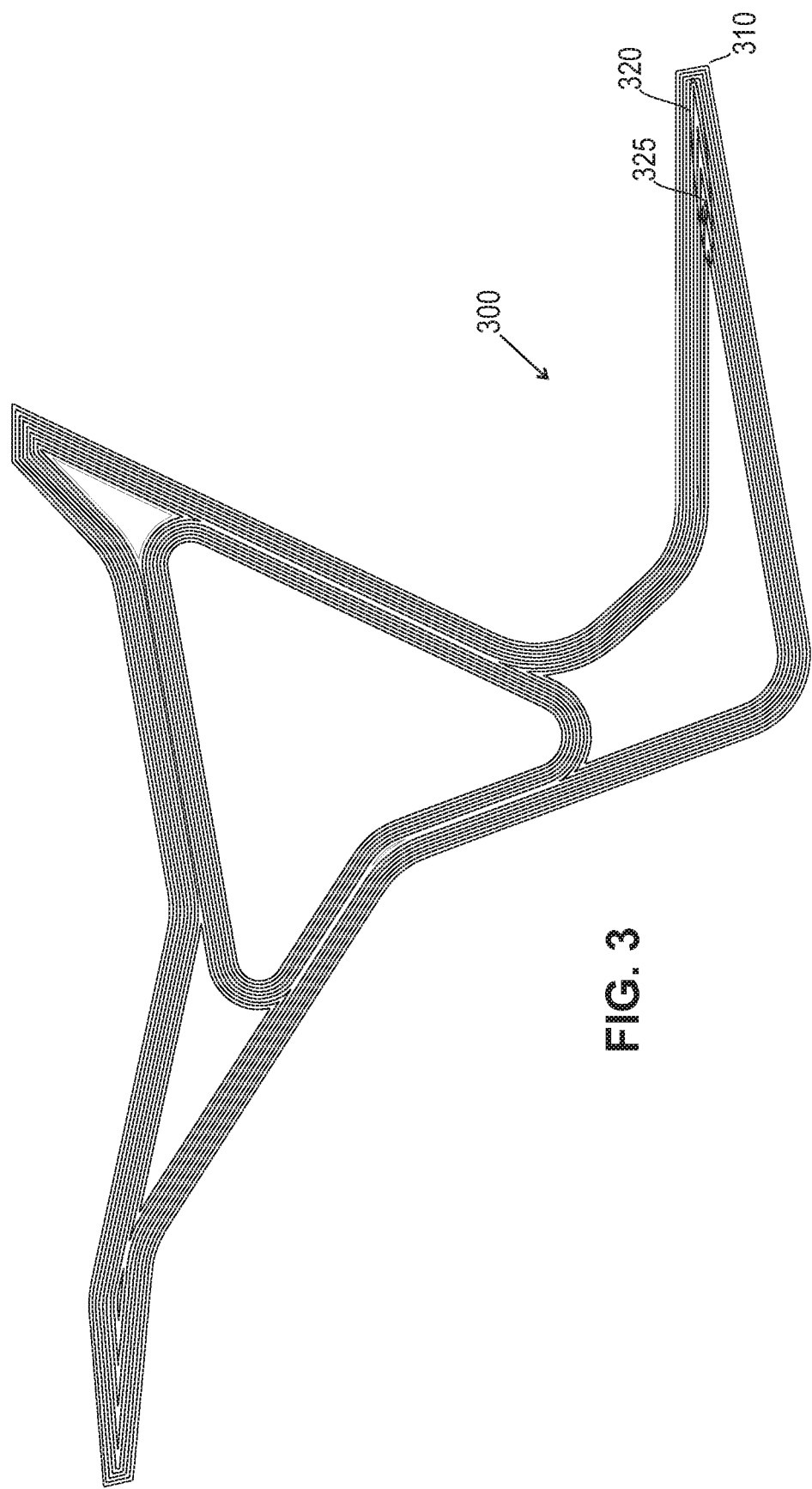
FIG. 3 illustrates a top view of a bicycle frame with material runs that illustrate a weak seam which would result if a print head could be ideally controlled to turn with a turning radius of zero.

FIG. 3 shows a slice in the x-y plane of a part, a bicycle frame, 300 that is generated by creating concentric offset paths from the outline edges of the part 300. The paths are shown as continuous through a sharp angle 310, and at some point are not possible to print given current constraints which limit the printhead to a turning radius of about 20 mm. In FIG. 3, while long continuous material paths are shown, a large number of paths terminate into each other at a sharp angle. The fiber ends, such as end 325, in region 320 all are in a straight line and would cause a weak seam in the part even if it was possible to print continuously through the sharp angle. Such a seam is weak since the sharp angle turn of the fibers within the filament does not allow much, if any, stress to get dissipated by the fibers. In accordance with the illustrative embodiments, article 300 is 81.3 cm by 45.7 cm by 2.0 cm. These dimensions are for a representative bike frame test part. It will be clear to those skilled in the art, after reading this disclosure, how to make and use alternative embodiments of the present invention to manufacture actual bicycle frames having differing widths, lengths, and depths, such as 73 cm×58 cm×6.4 cm, as well as a wide variety of different articles as desired.

Further, looking at region 330 of frame 300, it is seen that while the tool path is shown as making the corners without starting and stopping, the edge portions in region 330 are very short. These short portions are not desirable, and aspects of the present invention teach advantageous techniques for reducing their number or eliminating them altogether.

Figure 4:
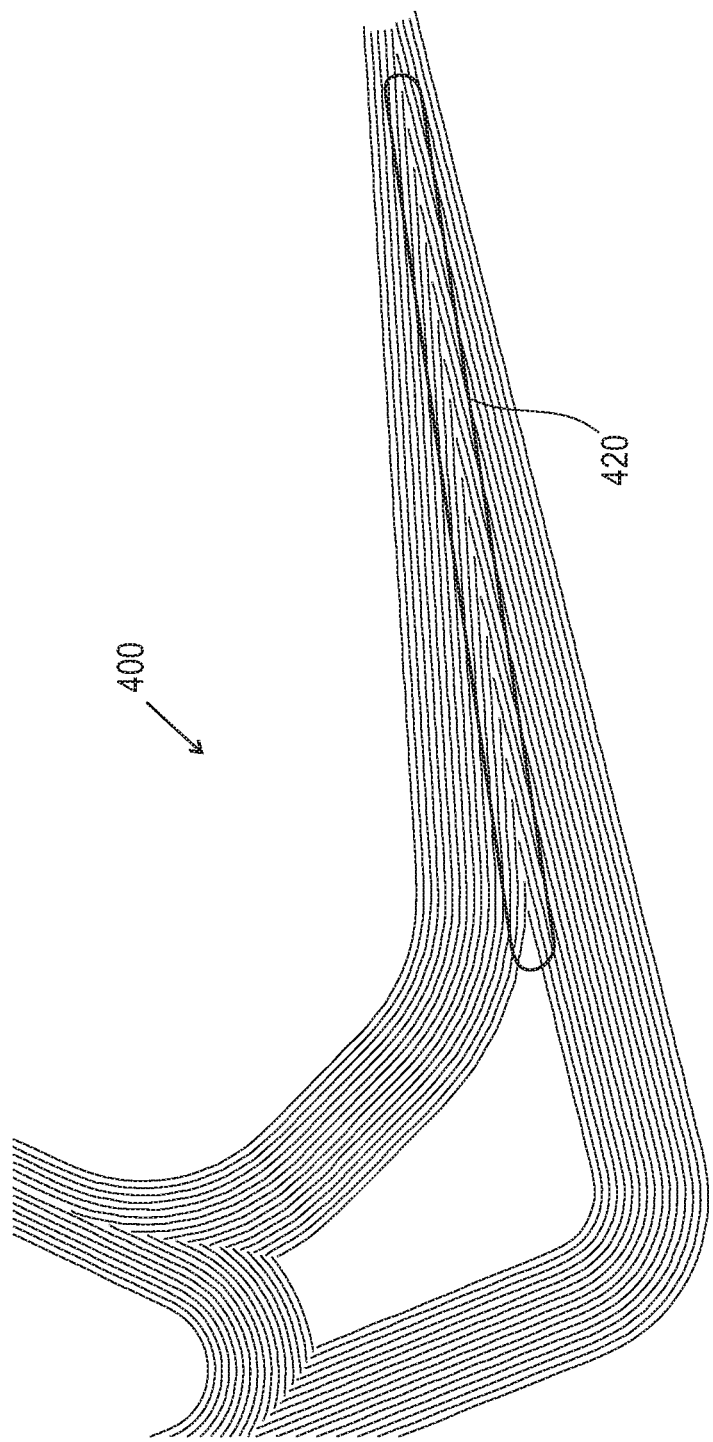
FIG. 4 illustrates a top view of a single horizontal layer of a portion of a bicycle frame employing filament feathering printed with gaps in accordance with the present invention.

An alternative x-y plane slice of a portion of an article or part 400 is shown in FIG. 4. By contrast, with FIG. 3, FIG. 4 shows an example of fiber feathering as well as, the result of tool path generation to preserve filament continuity in accordance with the present invention applied to a part 400 which again may suitably be a bicycle frame. As addressed further below, the feathering in region 420 is a result of offsetting from some of the edges of the part, but not all the edges seen in the entire outline of the part. It is seen that the edges terminate into each other in a staggered fashion with gaps as illustrated in greater detail in FIG. 6A. It will be noted that the filament segments shown in FIGS. 6A and 6B have fiber reinforcement which is not illustrated in these figures.

Additionally, the very short portions seen in FIG. 3 in region 330, for example, have substantially reduced strength even if the tool path is able to turn the corner in region 330 as shown. Aspects of the present invention advantageously address this problem by identifying and eliminating the short edges and acute angle turns as discussed further below.

The section of the part 400 in region 420 is weaker than in some other regions but is better than having the edges all aligned in a single line as shown in FIG. 3. It will also be noticed in this image that there is a little bit of a gap between the path ends. In this embodiment, it has been chosen to have a gap instead of an overlap between two fibers. In this regard, it will be recognized that the heated filament will tend to spread so that any small gaps will tend to fill. In contrast, where overlaps are employed while gaps are eliminated any unevenness can possibly propagate upwards in the z-direction.

Figure 5:
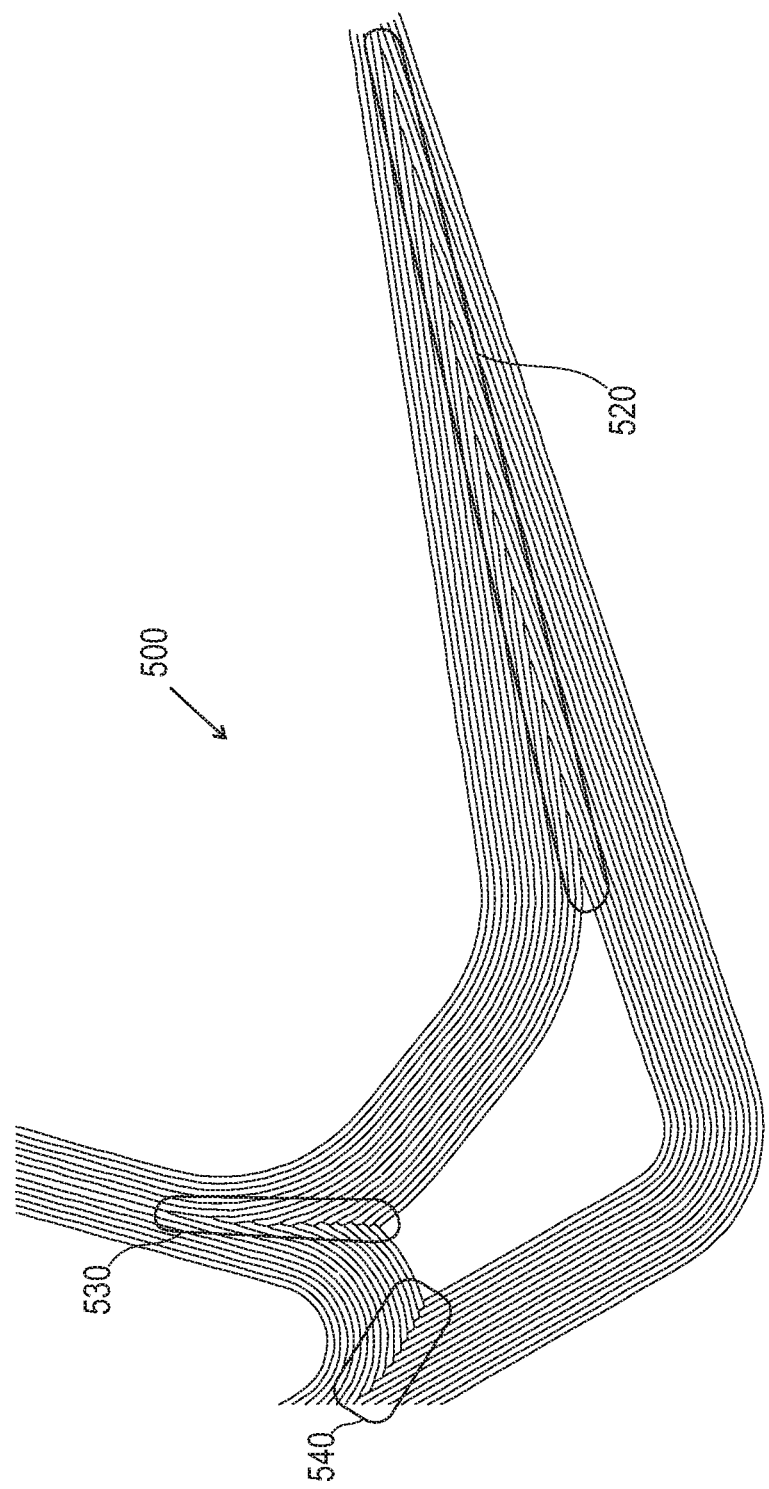
FIG. 5 illustrates a top view of a single horizontal layer of a portion of a bicycle frame employing filament feathering printed with overlaps in accordance with the present invention.
Figure 6B:
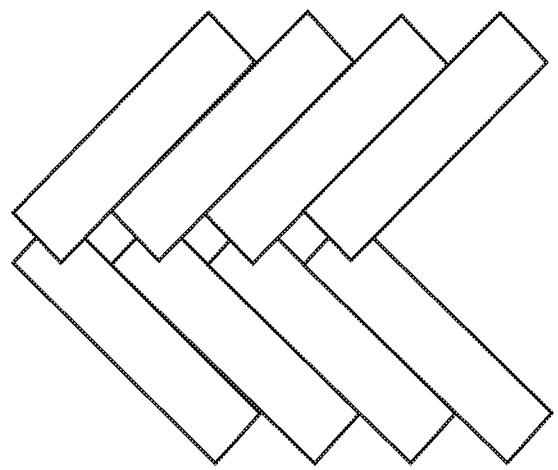
FIGS. 6A and 6B further illustrate the differences between fiber feathering with overlaps and gaps, respectively.
Figure 6A:
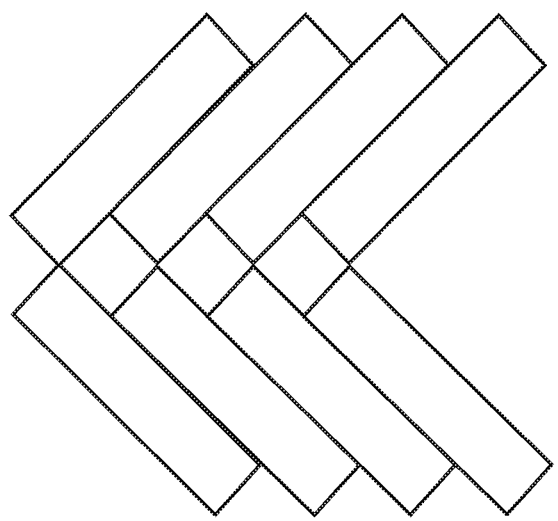

FIG. 5 shows an alternative feathering arrangement with overlaps and no gaps of an alternative part 500. The feathering is seen in regions 520, 530 and 540 and the overlaps are most clearly seen in regions 530 and 540 and are further illustrated in FIG. 6B.

There are pros and cons to both gaps and overlaps. Gaps are generally preferred because an overlap can cause excess material build up and thus result in issues in printing on top of them. With gaps, usually some excess material will fill in the voids as filament is deposited, but small gaps may still remain and the area filled only with spread without reinforcing fiber will still present a weaker area.

FIG. 7 shows a top view of the entirety of an x-y slice of bicycle frame 700 portions 400 and 500 of which are shown in FIGS. 4 and 5. Consistent with a design goal of long uninterrupted edges, four long edges 702, 704, 706, and 708 are identified. A portion of long edge 702 corresponds to a down tube of the bicycle frame 700. Another portion comprises a bottom bracket. A portion of long edge 704 corresponds to a chainstay and a further portion comprises a seat tube. A portion of long edge 706 defines a top tube.

Figure 8A:
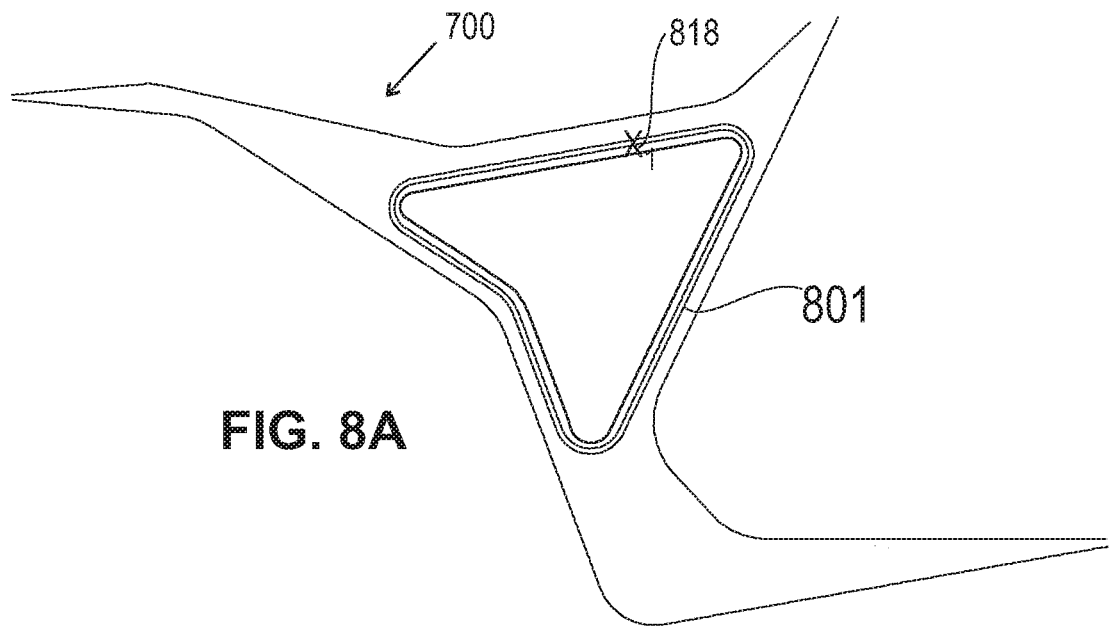
FIG. 8A shows a first offset edge.

Toward the end of avoiding the problems illustrated in FIG. 3, for example, short edges 712, 714, and 716 are identified and omitted as part of the design process to eliminate or reduce sharp corners and acute angle turns by the print head. Thus, when a first material run or edge path 702 is printed, it starts near omitted edge 716 and is cut or ended just before reaching omitted edge 712. Similarly, second and third material runs or edge paths 704 and 706 begin and end near their respective omitted edges 712 and 714 and 714 and 716, respectively. A fourth material run or edge path 708 can begin at a point such as point $x_0$ 718 and end there as well. As discussed above, subsequent offset edges around void or opening 720 will be offset as shown in FIG. 1B and FIG. 8A starting and ending at an offset point $x_1$ 818, for example. As further shown in FIG. 8E, a further offset edge surrounding void or opening 720 might start and end at point $x_2$ 820.

Figure 8B:
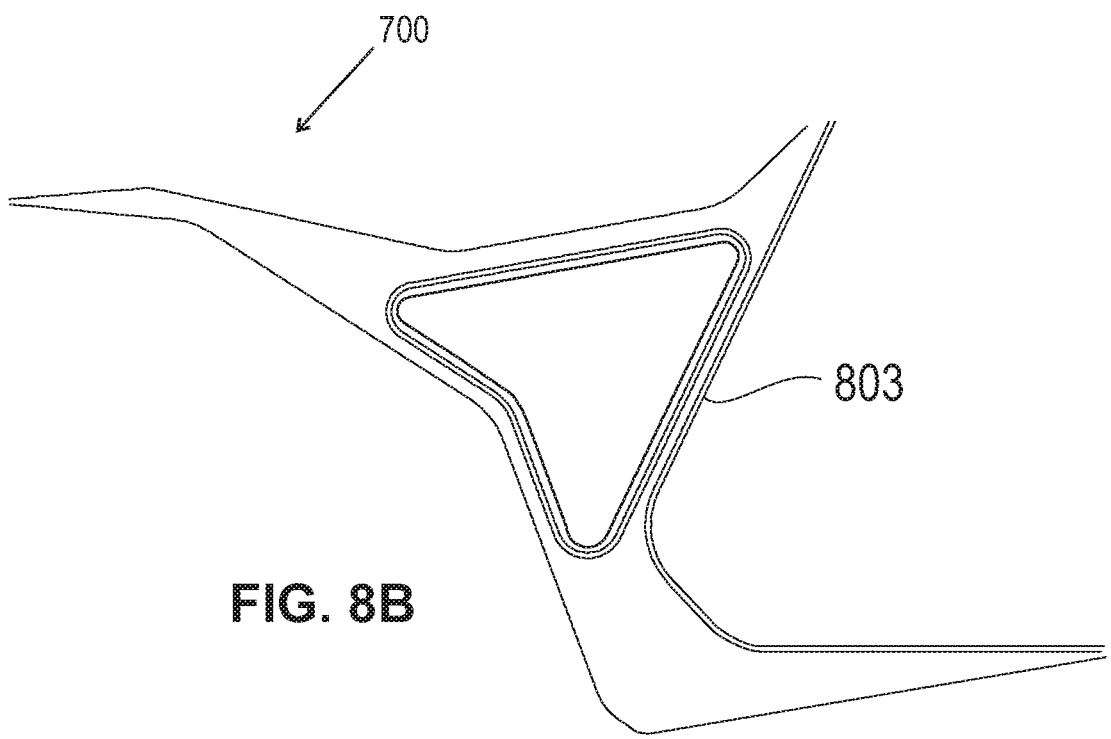
FIG. 8B shows a second offset edge.
Figure 8C:
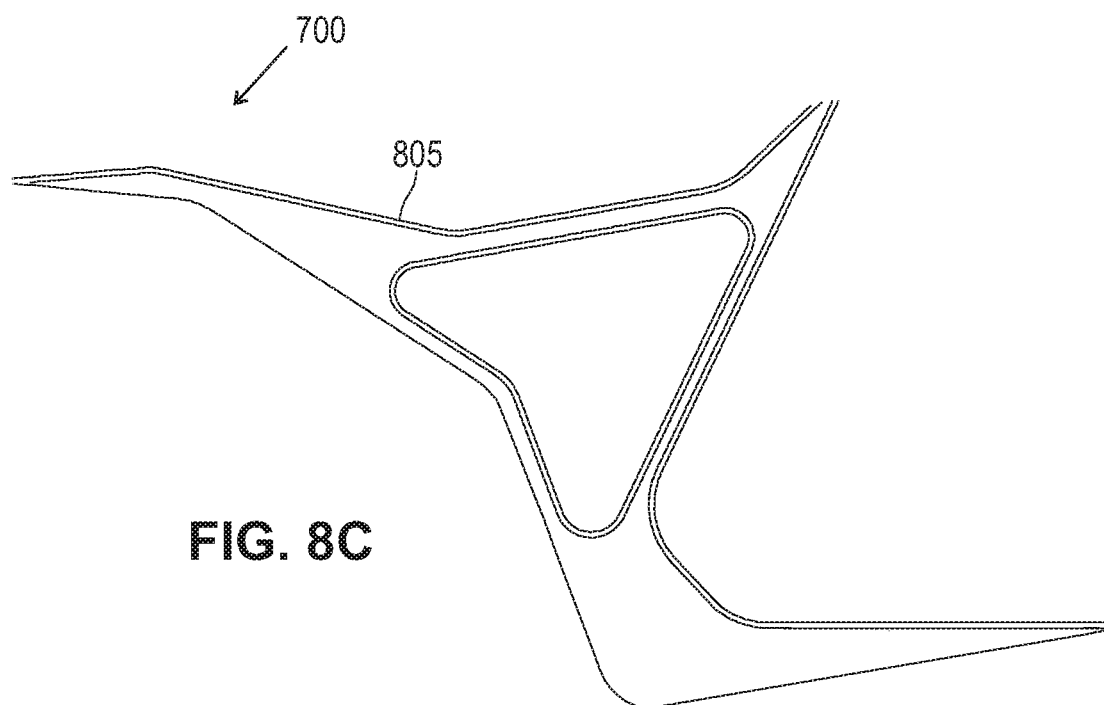
FIG. 8C shows a third offset edge.
Figure 8D:
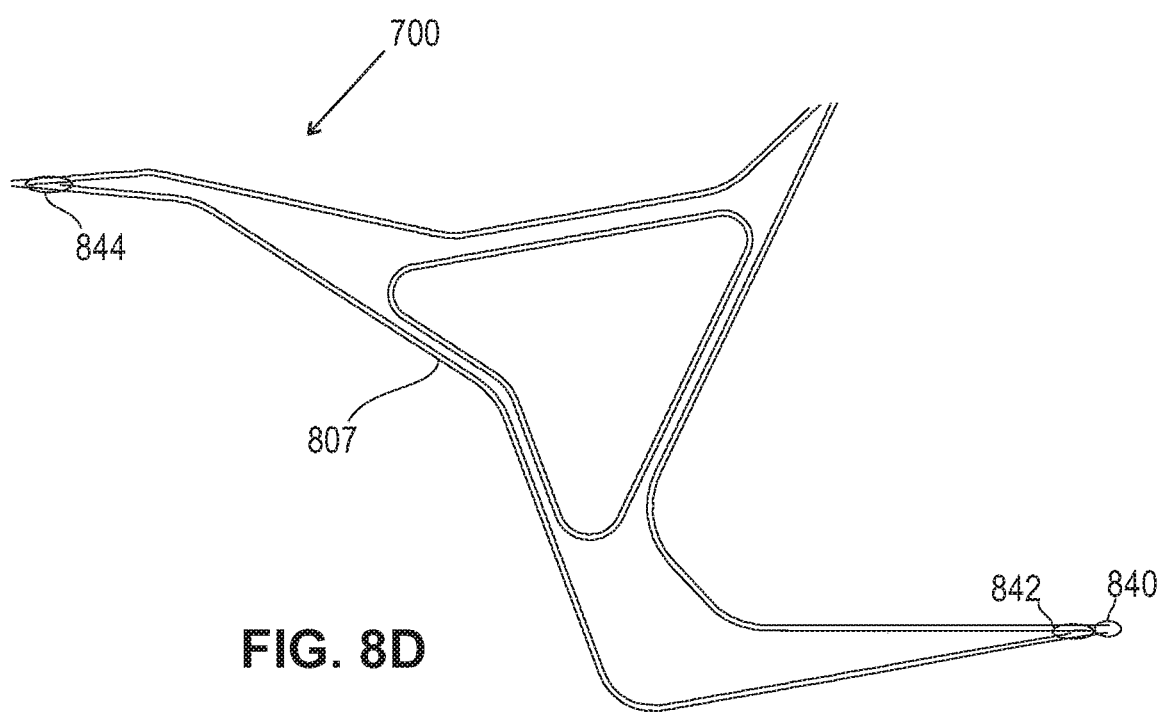
FIG. 8D shows a fourth offset edge.
Figure 8E:
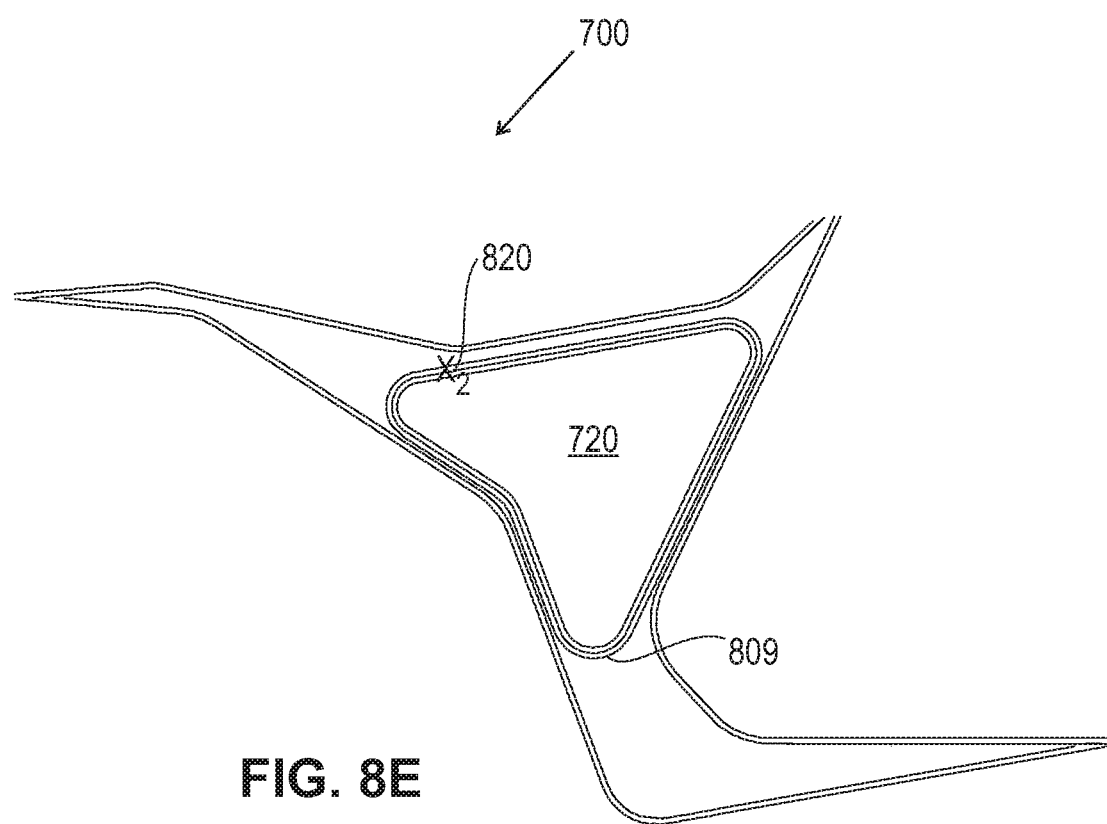
FIG. 8E shows a fifth offset edge.

In FIG. 8A, a first offset edge 801 is generated which is offset from edge material path or edge 708. As a centerline of edge 708 is spaced a distance the width, w, of edge 708 divided by two from the part's intended edge, the centerline of offset edge 801 is 3w/2 from the intended edge. In FIG. 8B, a second offset edge 803 is generated beside edge 704. In FIG. 8C, a third offset edge 805 is generated beside edge 706. In FIG. 8D, a fourth offset edge 807 is generated beside edge 702. The process continues in FIG. 8E with a fifth offset edge 809 beside the first offset edge 801.

As can be seen in FIGS. 8A-8E as each new edge is added, the edge gets clipped or otherwise ended just before it intersects with a previous edge that is already present. Examples of this clipping are when second offset edge 803 is added, it is clipped just before it reaches original edge 702. Similarly, when fourth offset edge 807 is added, it is clipped as it intersects second offset edge 803 in region 840. A result of this strategy is fiber feathering in areas 842 and 844 of FIG. D, respectively. A further result is that very short segments of material like those in region 330 of FIG. 3 are eliminated preserving filament continuity.

To achieve the desired clipping, the present invention advantageously employs a clipping outline that is used to clip the edges to the correct size as addressed further herein. The present approach maintains a desired two dimensional polygon of the empty space remaining that can be filled with tool paths or material runs. As each edge is added, the clipping outline is updated with the empty space being reduced appropriately. The updated clipping outline is then used to clip the next edge that is added. As further edges are generated, the clipping outline is continually updated to maintain an accurate representation of the empty space left to be filled. The space remaining once all the edges are generated can be filled with an infill pattern or could be left empty depending upon design constraints regarding weight, strength, cost and the like.

FIG. 9A shows starting edges 702, 704, 706, and 708 for the bicycle frame 700 corresponding to those shown in FIG. 7 alongside a starting clipping outline 900 having external edge 912 and internal edge 914 as shown in FIG. 9B. Edge 912 surrounds the exterior of the desired bike frame and edge 914 surrounds void 720. As the edges 702, 704, 706, and 708 have a width, w, and are printed with a centerline inset a distance w/2, from where the actual edge of the bicycle frame is desired, the starting clip outline 900 is established at the actual edge of the bicycle frame as a frame of reference for the external starting edges and the edge around the void.

Figure 10B:
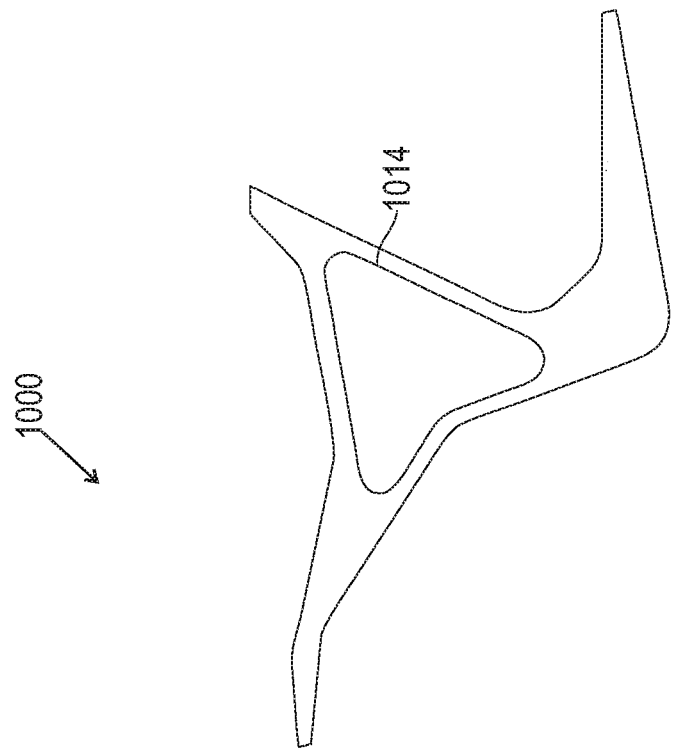
Figure 10A:
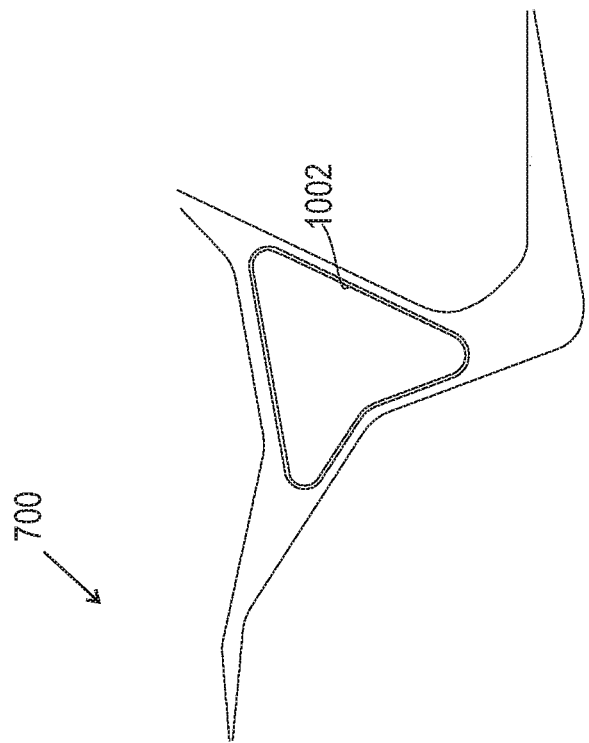

In FIG. 10A, first offset edge 1002 is added with its center line 3w/2 from the intended edge of the bicycle frame, the clipping outline 914 is adjustably spaced in from the edge of the void resulting in a new clipping outline 1000 with a portion 1014 surrounding the void moved to a distance 2w from the edge of void 1006 and the other edges moved to a distance w from the intended external edge. The net effect of the first clipping outline is to rule out filament or material printing outside that outline which in turn is advantageously utilized to achieve the desired clipping and the feathering addressed in connection with FIGS. 8B and 8D above.

Figure 11B:
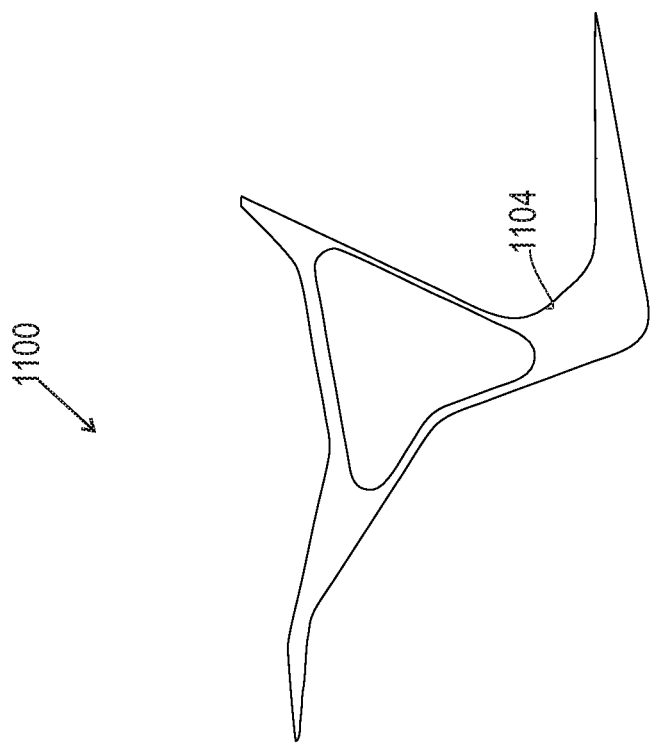
FIGS. 11A and 11B show offset edge two and clipping outline two side by side.
Figure 11A:
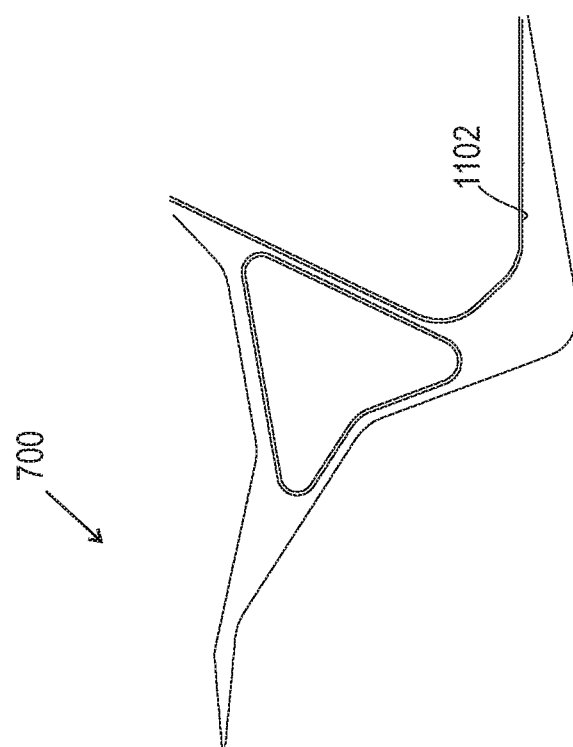

In FIG. 11A, second offset edge 1102 is added beside existing starting edge 704. In second clipping outline 1100 of FIG. 11B, the clipping outline portion 1104 along edge 704 is now moved from w to a distance 2w from the intended bicycle frame edge.

Figure 12B:
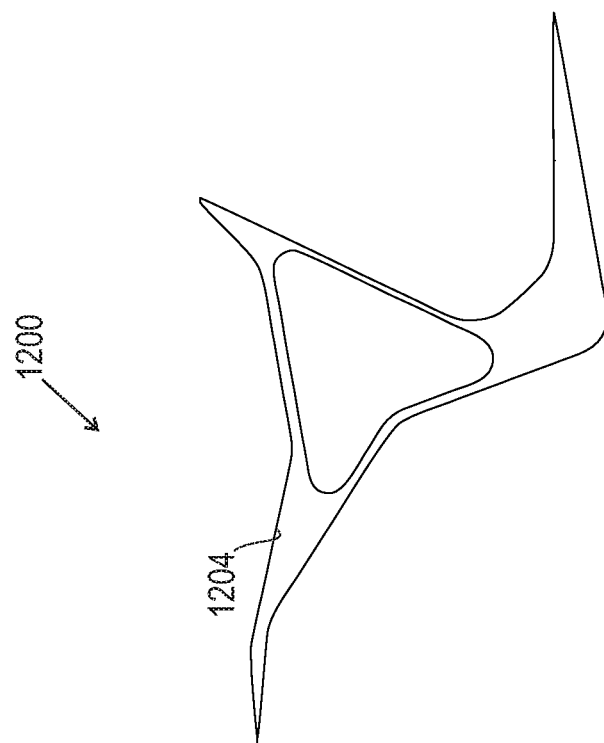
FIGS. 12A and 12B show offset edge three and clipping outline three side by side.
Figure 12A:
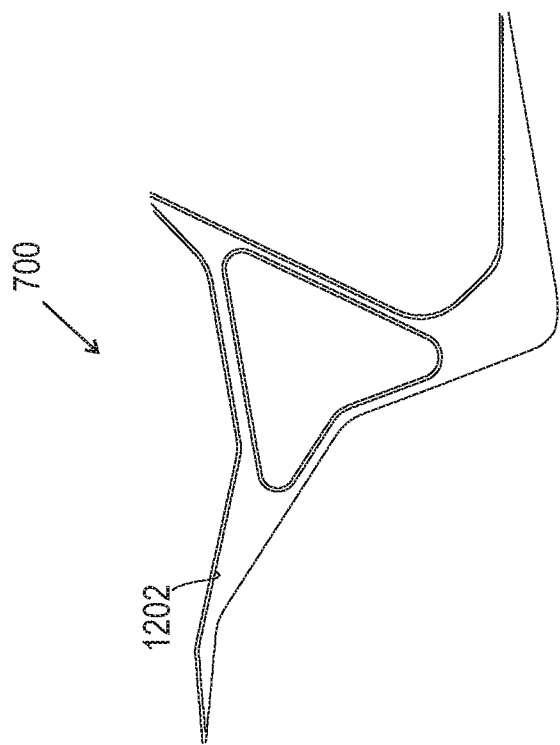

Similarly, in FIG. 12A, third offset edge 1202 is added in FIG. 12A beside existing starting edge 706. In third clipping outline 1200 of FIG. 12B, clipping outline portion 1204 along edge 706 is now moved from w to a distance 2w from the intended bicycle frame edge.

In FIG. 13A, fourth offset edge 1302 is added beside existing starting edge 702. In fourth clipping outline 1300 of FIG. 13B, portion 1304 of the clipping outline along edge 702 is now moved from w to a distance 2w from the intended bicycle frame edge.

Figure 14B:
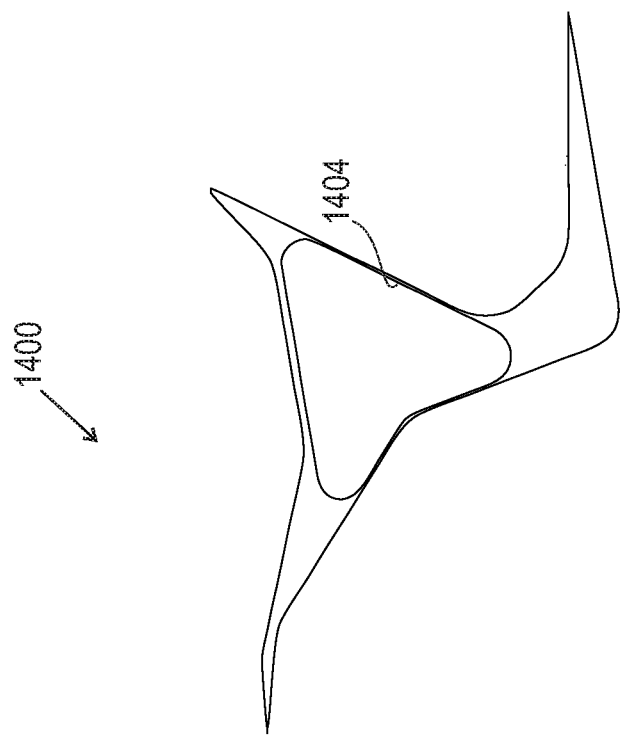
FIGS. 14A and 14B show offset edge five and clipping outline five side by side.
Figure 14A:
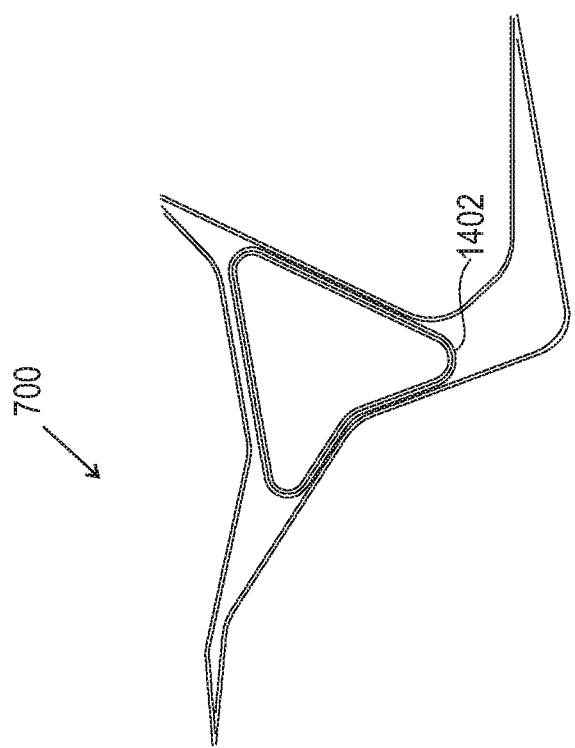

In FIG. 14A, fifth offset edge 1402 is added beside first offset edge 1002 and starting edge 708. In fifth clipping outline 1400 of FIG. 14B, portion of clipping outline 1404 is now moved from 2w to 3w.

Figure 15B:
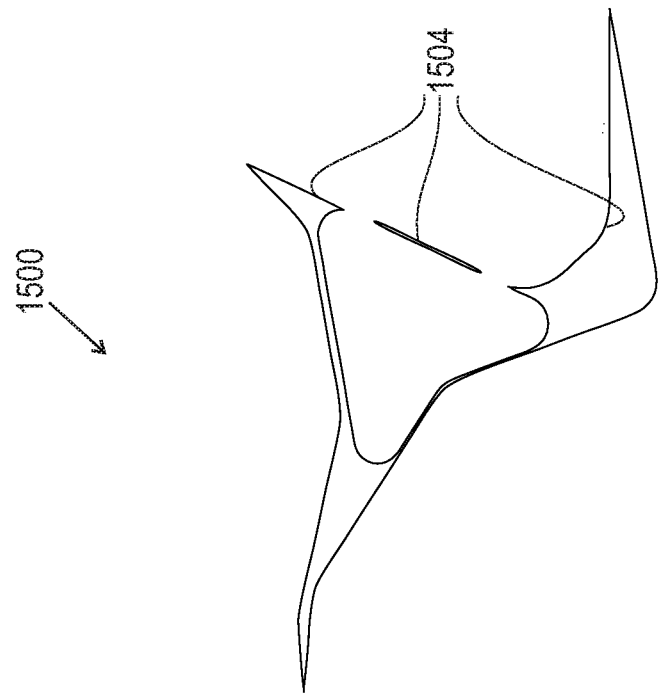
FIGS. 15A and 15B show offset edge six and clipping outline six side by side.
Figure 15A:
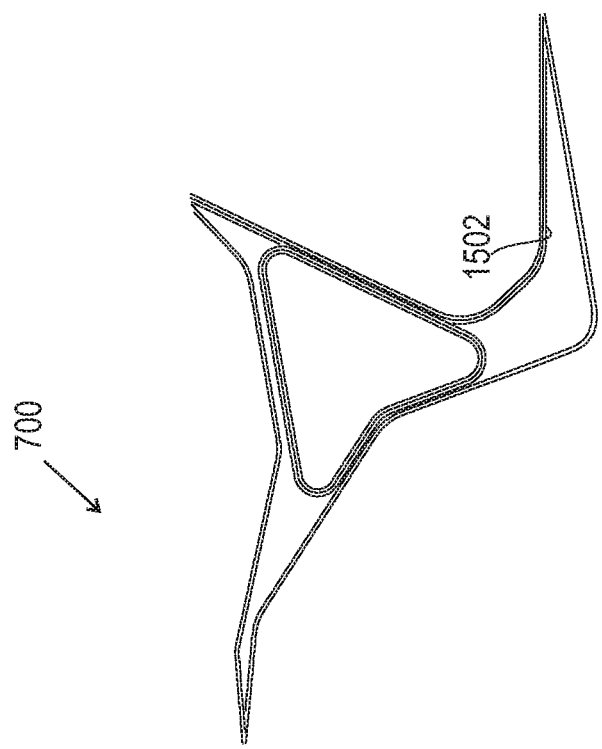

In FIG. 15A, sixth offset edge 1502 is added beside second offset edge 1102 and starting edge 704. In sixth clipping outline 1500 of FIG. 15B, clipping outline portion 1504 is now moved from 2w to 3w.

Figure 16B:
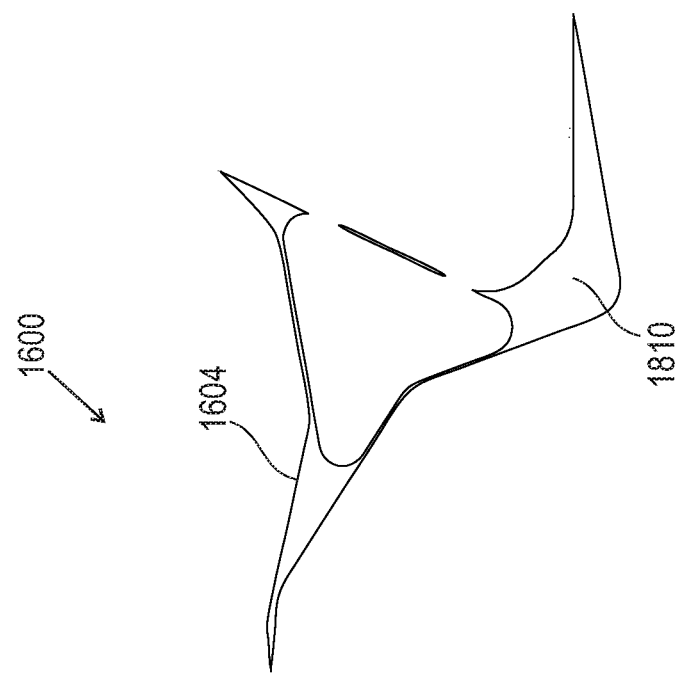
FIGS. 16A and 16B show offset edge seven and clipping outline seven side by side.
Figure 16A:
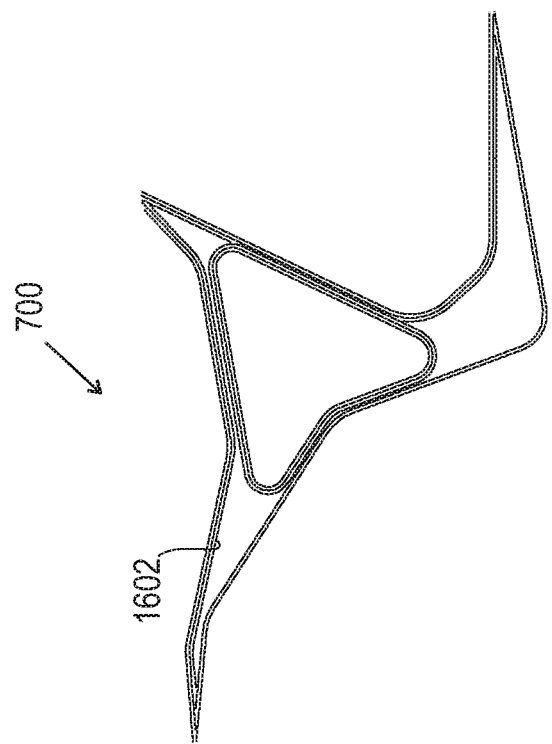

In FIG. 16A, seventh offset edge 1602 is added beside third offset edge 1202. In the seventh clipping outline 1760 of FIG. 16B, clipping outline portion 1604 is now moved from 2w to 3w.

Figure 17A:
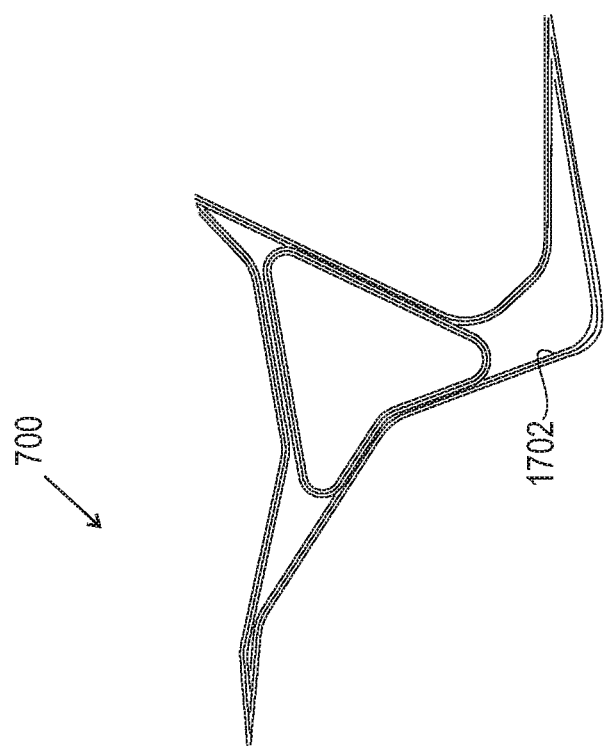
FIGS. 17A and 17B show offset edge eight and clipping outline eight side by side.
Figure 17B:
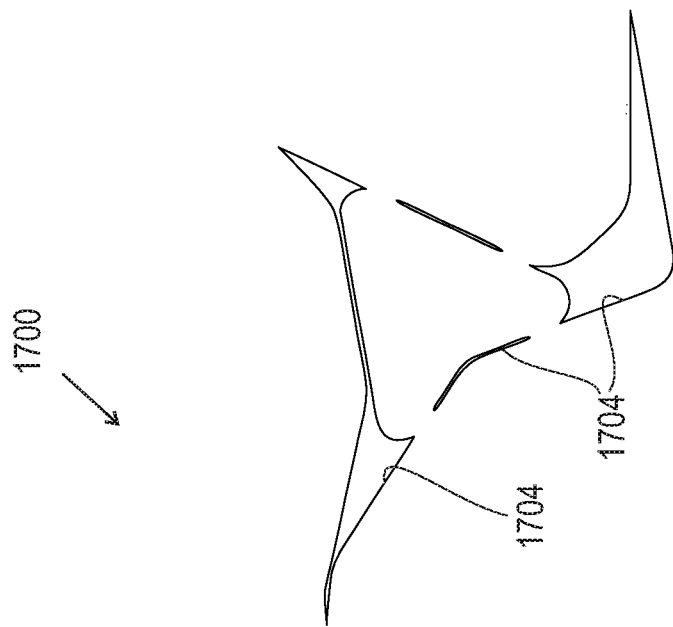

In FIG. 17A, eighth offset edge 1702 is added beside offset edge 1302 and starting edge 702. In the eighth clipping outline 1700 of FIG. 17B, portion of clipping outline 1704 is now moved from 2w to 3w.

Figure 18B:
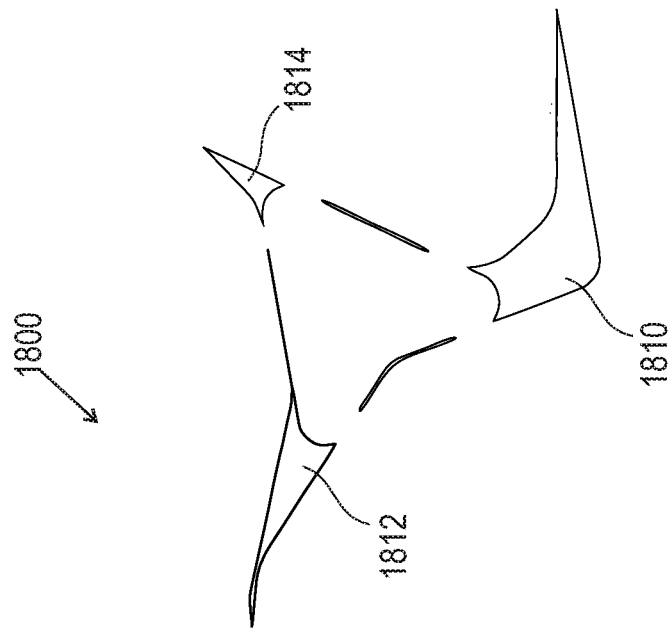
FIGS. 18A and 18B show offset edge nine and clipping outline nine, respectively, side by side.
Figure 18A:
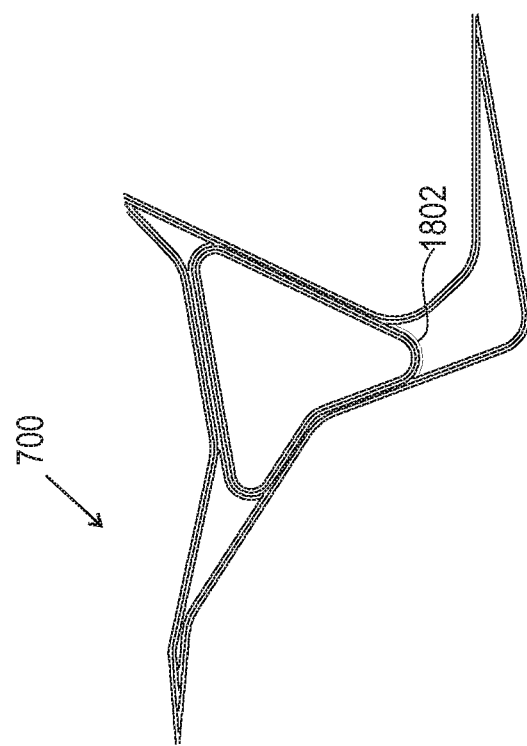

Finally, in FIG. 18A, ninth offset edge 1802 is added beside offset edges 1802, 1402, 1002 and starting edge 708. Clipping outline 1800 as shown in FIG. 18B is generated. Looking at clipping outline 1800, it is seen that the remaining space is largely concentrated in three voids 1810, 1812, and 1814. Depending upon the design parameters of the bicycle frame 700, these voids might be left open or filled using a variety of infill techniques.

In the process and examples above, edge offsetting has been employed with turns being taken offsetting from each starting edge one by one. All of the tool paths and material runs illustrated are within one layer. Each edge gets a number of continuous paths offset from it until the part is finished.

It will be recognized that another suitable approach is to choose a single dominant edge and to continue offsetting as many paths as possible from it until the path gets broken up into smaller ones that are no longer either long or continuous. At that point, offsetting paths from the other non-dominant edges are started. More particularly, a predetermined length can be established and once that length is reached, then other edges can be offset from.

If after a first minimum length is reached, all the remaining edges have similar strength requirements, the alternating format discussed above in connection with FIGS. 9A-18B can be utilized. If all the remaining edges have differing strength requirements, the edge having the next highest strength demand can be utilized as the edge to offset from until the minimum length is again reached.

One reason it may be desired to employ the alternative approach is because more strength is desired along a particular edge which may be referred to as a dominant edge. The more long and continuous fiber reinforced filaments there are following that edge, the stronger that section of the part will be.

Once the ability is provided as taught herein to generate tool paths from a dominant edge, the edge which is the dominant edge may vary layer by layer as desired. Layers may be included in the design of an article of manufacture where all edges hold the same weight as addressed above in detail. Rotating between all of these options per layer or per second or subsequent layers provides good overall strength in the part as all the layers stack up. Each layer would have a different contribution to the overall strength of the part due to the dominant edges that have more fiber paths.

It is further recognized that these approaches may be implemented in 2.5D, as well as, true 3D.

In accordance with one design of a bicycle frame, the number of layers L in the fully-custom infill for article 151 is based on the desired thickness of the article (i.e., 50 to 60 mm) and the thickness of each layer (i.e., 0.5 mm). In particular, the fully-custom infill for article 151, in accordance with the first illustrative embodiment, comprises:

$$L = \frac{50 - 60 \text{ mm}}{.5 \text{ mm}} = 100 - 120 \text{ layers} \quad \text{(Eq. 1)}$$

It will be clear to those skilled in the art, after reading this disclosure, how to make and use alternative embodiments of the present invention in which the fully-custom infill comprises a different number of layers L.

The radius r of the turns in all of the segments is equal to or greater than 20 mm.

$$r \geq \frac{\rho}{2} \quad \text{(Eq. 3)}$$

It will be recognized alternative equipment might have a larger turning radius or that future equipment might have a smaller turning radius. Varying turning radii can be readily adapted to given the teachings of the present invention.

Figure 19:
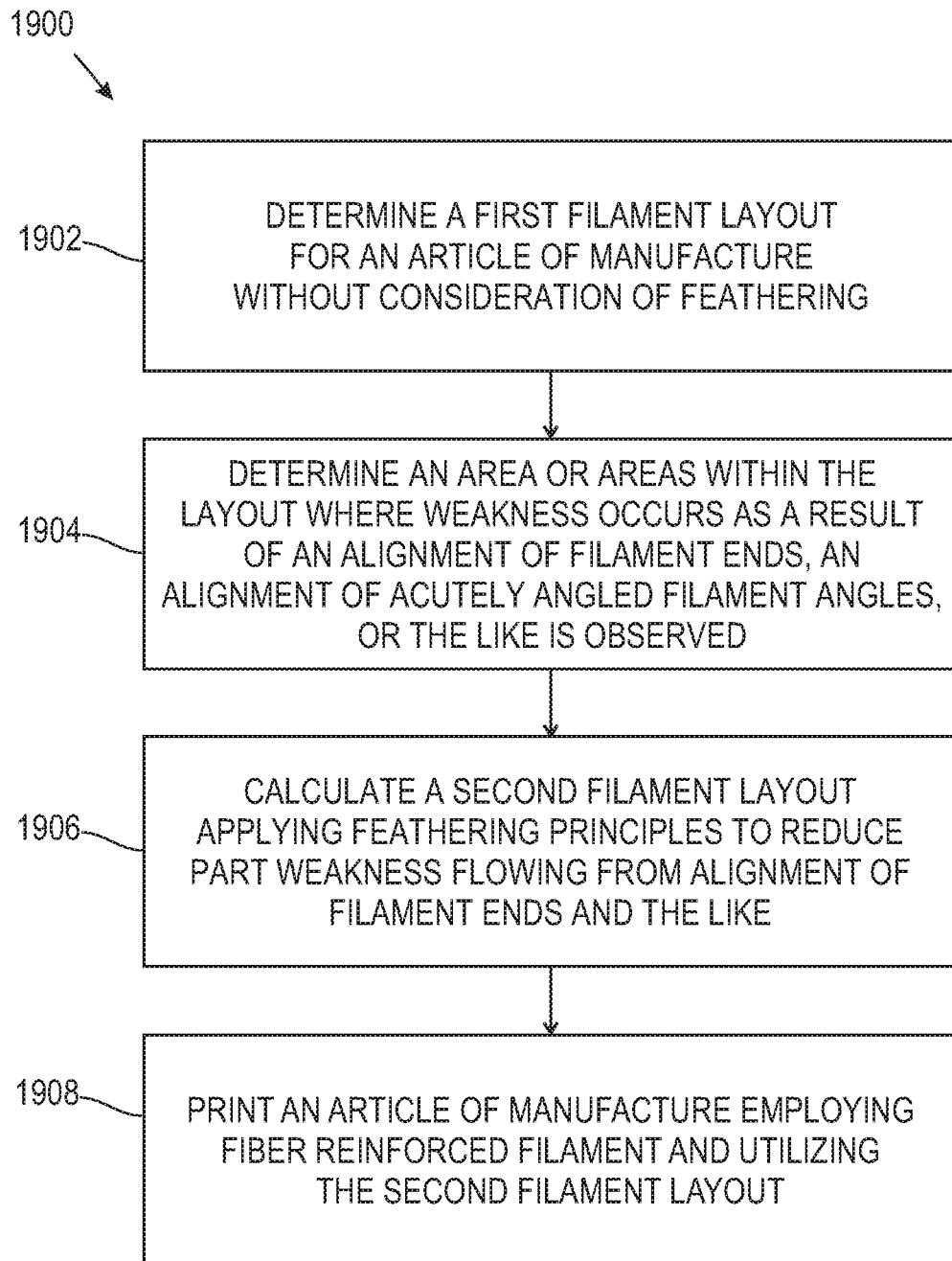
FIG. 19 shows a process for filament feathering in accordance with the present invention.

FIG. 19 shows a process of feathering 1900 in accordance with the present invention. In step 1902, a first filament layout for an article of manufacture is determined without consideration of feathering. In step 1904, an area or areas within the layout where weakness occurs are determined as a result of an alignment of filament ends, an alignment of acutely angled filament edges or the like. At step 1906, a second filament layout applying feathering principles to reduce part weakness flowing from alignment of filament and the like is devised. In step 1908, an article of manufacture is printed employing fiber reinforced filament and utilizing the second filament layout.

Among the tools developed by the present invention to implement the process 1900, techniques are provided to sort long edges from short edges. For example, straight edges of a potential tool path having a length greater than a predetermined length may be identified. More generally, edges having less than a maximum rate of curvature over a length greater than the predetermined length are identified. Acute angle turns along an exterior edge of a slice are also identified, as well as, the relationship of such identified acute angle turns to subsequent angles of redirected tool path movement. For example, a short edge may be identified as occurring over a distance less than a predetermined distance between a first acute and a subsequent angle less than a predetermined number of degrees. Any sufficiently short edge may be removed from the process of generating offset edges as addressed further above.

Figure 20:
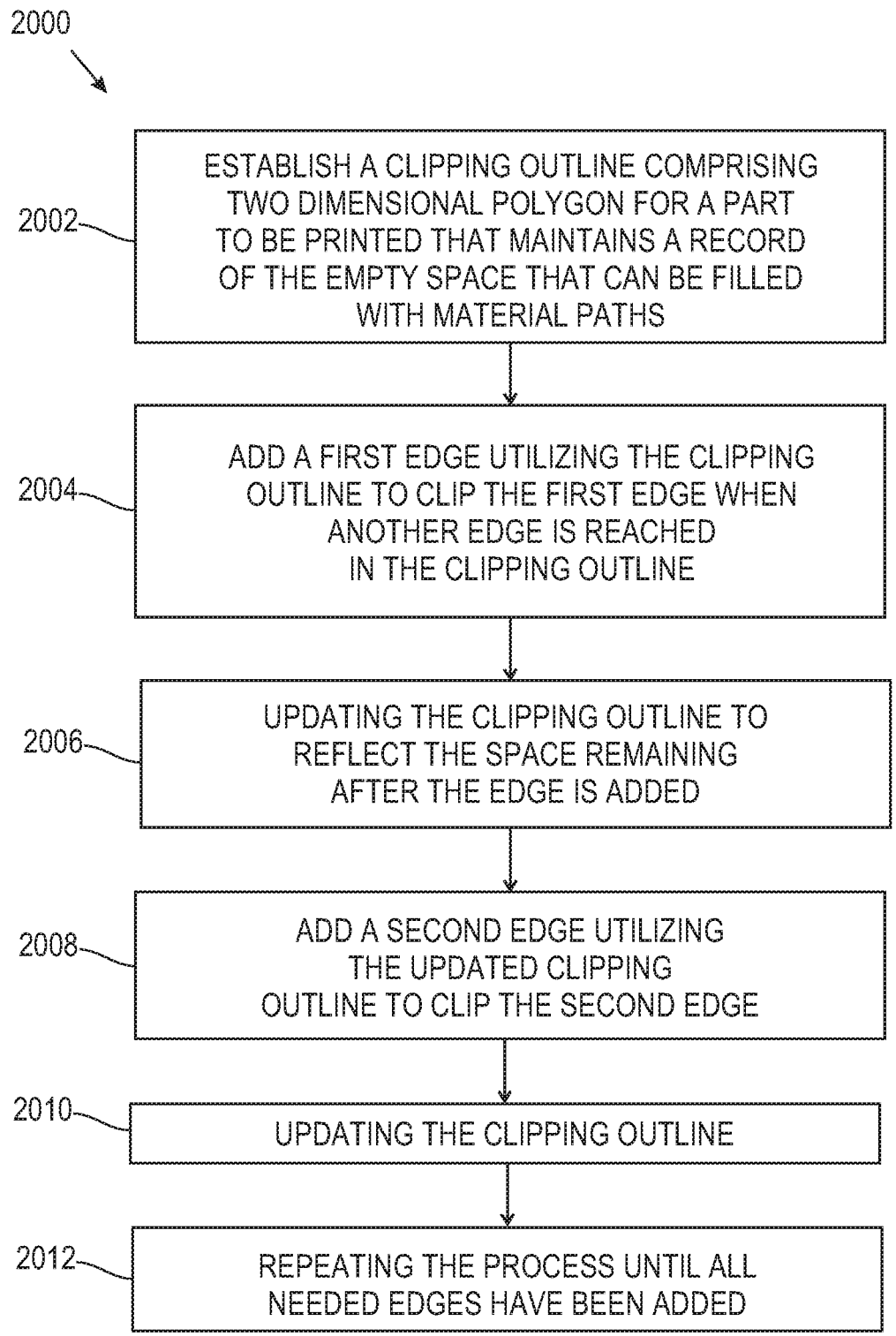
FIG. 20 shows a process for edge-offsetting to implement slicing to preserve filament continuity in accordance with the present invention.

FIG. 20 shows a process of generating tool paths to preserve continuity of fiber reinforced filaments 2000 in accordance with the present invention. In step 2002, a clipping outline comprising a two dimensional polygon for a part to be printed is established. This clipping outline maintains a record of the empty space that can be filled with material paths or runs. If the cross-section of the desired three dimensional part varies, the clipping outline for each side will be varied to reflect such variation as needed.

In step 2004, a first edge, a material run, is added utilizing the clipping outline to clip the first edge when another edge in the clipping outline is reached. For example, when edge 704 reaches the portion of clipping outline 912 corresponding to omitted edge 712.

In step 2006, the clipping outline is updated to reflect the space remaining after the first edge is added in step 2004.

In step 2008, a second edge is added utilizing the updated clipping outline from step 2006 to clip the second edge.

In step 2010, the clipping outline is updated to reflect the space remaining after the second edge is added.

In step 2012, the process is repeated until all needed edges have been added.

Figure 21:
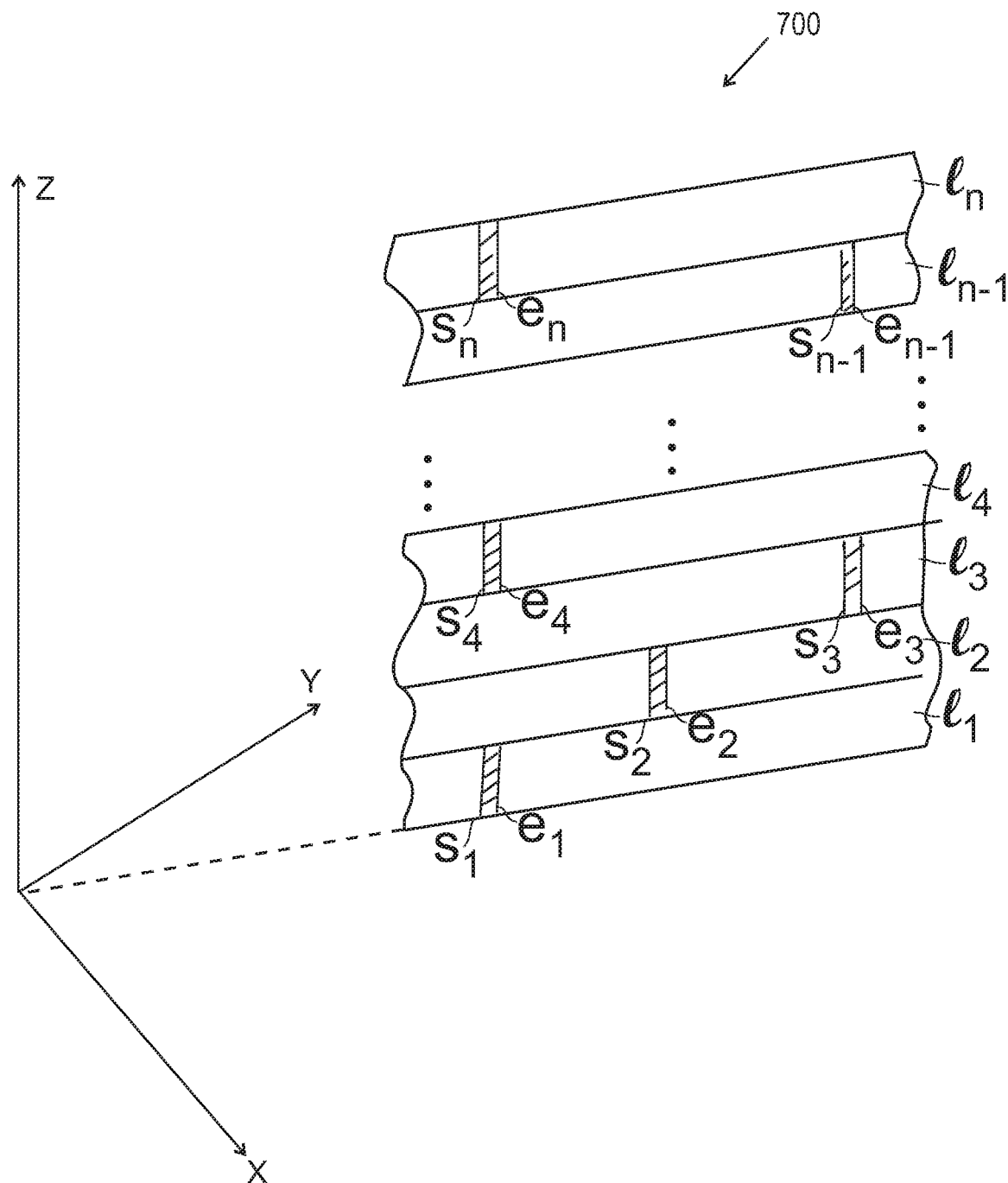
FIG. 21 shows a cross-sectional illustration of fiber reinforced filaments beginning and ending in a series of horizontal x-y plane slices that have been further sliced in the z plane to illustrate distribution of the beginnings and endings in the z dimension in accordance with aspects of the present invention.

The presently preferred approach to generating tool paths to prevent weak spots as a result of the alignment of material run starts and stops can advantageously also be applied in the z dimension, as well as the x-y plane. For cyclic paths which repeat across slices, it is not desirable to have all the start and end points line up across all or multiple layers in the part. As was the case in the x-y plane, such alignment would cause a weak seam in the part where it is more likely to fail. As seen in FIG. 21, starts s1, s2, s3, s4 . . . sn−1 and sn and ends e1, e2, e3, e4 . . . en−1 and en are shown for layers or slices l1, l2, l3, l4 . . . ln−1 and ln. FIG. 21 shows a cross-section or slice in the z-dimension to illustrate in broad terms, a distribution of starts and stops across layers or slices of the bike frame 700.

To address the issue, an algorithm has been implemented to distribute the starts of cyclic paths. Another constraint utilized is that it is much less desirable to start or end a path on a curve. So, in addition to distributing the starts it is desirable to put them in locations where the filament will be relatively straight. Consequently, all of the straight segments of a path are first identified. After identifying these regions, the path is analyzed looking for a starting point that is at least a predetermined distance away from all the other start points that have been determined so far. This distance is advantageously a user established parameter. When checking if a point is far enough away from other points, the algorithm has been designed to only look a certain number of layers below the current layer. This number is again a user selectable parameter. Once a suitable start point is established the array of points defining the tool path is rotated so the path starts at the point. It is possible that no ideal starting point can be found, in which case, a random location can be selected. It will be recognized an alternative approach can be employed in which constraints are gradually loosened until a point meeting the loosened constraints is picked.

For the user selectable parameters, a minimum separation of 5-40 mm and 2-5 layers down are possible ranges to be selectable from.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

For example, while the present invention is described in the context of presently preferred systems and materials, it will be recognized that these systems and materials are likely to evolve with time and that the disclosed solutions to problems are generally applicable to additive manufacturing contexts, where these problems arise.

Also, while many of the originally filed claims are directed to articles of manufacture, it will be understood that machines and processes are described herein and may also be claimed by this application or a continuation hereof.

What is claimed is:

1. An article of manufacture comprising:
a first length of continuous fiber-reinforced thermoplastic filament that comprises a first proximal end, a first distal end, and a first lateral surface between the first proximal end and the first distal end;
a second length of continuous fiber-reinforced thermoplastic filament that comprises a second proximal end, a second distal end, and a second lateral surface between the second proximal end and the second distal end, wherein the second proximal end is fused to a first portion of the first lateral surface at a first joint;
a third length of continuous fiber-reinforced thermoplastic filament that comprises a third proximal end, a third distal end, and a third lateral surface between the third proximal end and the third distal end, wherein a second portion of the third lateral surface is fused to a third portion of the first lateral surface, and wherein the third proximal end is fused to a fourth portion of the second lateral surface at a second joint;
a fourth length of continuous fiber-reinforced thermoplastic filament that comprises a fourth proximal end, a fourth distal end, and a fourth lateral surface between the fourth proximal end and the fourth distal end, wherein a fifth portion of the fourth lateral surface is fused to a sixth portion of the second lateral surface, and wherein the fourth proximal end is fused to a seventh portion of the third lateral surface at a third joint;
a fifth length of continuous fiber-reinforced thermoplastic filament that comprises a fifth proximal end, a fifth distal end, and a fifth lateral surface between the fifth proximal end and the fifth distal end, wherein the fifth proximal end is fused to the fifth distal end at a fourth joint, wherein an eighth portion of the fifth lateral surface is fused to a ninth portion of the third lateral surface, and wherein a tenth portion of the fifth lateral surface is fused to an eleventh portion of the fourth lateral surface.

2. The article of claim 1 further comprising:
a sixth length of continuous fiber-reinforced thermoplastic filament that comprises a sixth proximal end, a sixth distal end, and a sixth lateral surface between the sixth proximal end and the sixth distal end, wherein the sixth proximal end is fused to the sixth distal end at a fifth joint, and wherein a twelfth portion of the sixth lateral surface is fused to a thirteenth portion of the fifth lateral surface.

3. The article of claim 2 wherein the fourth joint is offset from the fifth joint.

4. The article of claim 3 further comprising:
a seventh length of continuous fiber-reinforced thermoplastic filament that comprises a seventh proximal end, a seventh distal end, and a seventh lateral surface between the seventh proximal end and the seventh distal end, wherein the seventh proximal end is fused to the seventh distal end at a sixth joint, and wherein a fourteenth portion of the seventh lateral surface is fused to a fifteenth portion of the sixth lateral surface.

5. The article of claim 2 wherein the fifth joint is offset from the sixth joint.

* * * * *